United States Patent
Meess et al.

(10) Patent No.: US 10,620,611 B2
(45) Date of Patent: Apr. 14, 2020

(54) COORDINATED MULTI-TOOL ADDITIVE MANUFACTURING METHOD

(71) Applicant: AUTODESK, INC., San Rafael, CA (US)

(72) Inventors: Gregory David Meess, Berkeley, CA (US); Kenneth Lawrence Mejia, San Francisco, CA (US); Matthew Hovanec, Berkeley, CA (US); Andreas Linas Bastian, Oakland, CA (US); Cory Mark Bloome, San Francisco, CA (US); Peter J. Schmehl, Berkeley, CA (US); Joseph Isaac Sadusk, San Francisco, CA (US); James Sherwood Page, Berkeley, CA (US)

(73) Assignee: Autodesk, Inc., San Rafael, CA (US)

( * ) Notice: Subject to any disclaimer, the term of this patent is extended or adjusted under 35 U.S.C. 154(b) by 60 days.

(21) Appl. No.: 15/758,701

(22) PCT Filed: Sep. 9, 2016

(86) PCT No.: PCT/US2016/051163
§ 371 (c)(1),
(2) Date: Mar. 8, 2018

(87) PCT Pub. No.: WO2017/044892
PCT Pub. Date: Mar. 16, 2017

(65) Prior Publication Data
US 2018/0253080 A1 Sep. 6, 2018

Related U.S. Application Data

(60) Provisional application No. 62/217,452, filed on Sep. 11, 2016.

(51) Int. Cl.
*G05B 19/4099* (2006.01)
*B29C 64/386* (2017.01)
(Continued)

(52) U.S. Cl.
CPC ........ *G05B 19/4099* (2013.01); *B29C 64/118* (2017.08); *B29C 64/245* (2017.08);
(Continued)

(58) Field of Classification Search
None
See application file for complete search history.

(56) References Cited

U.S. PATENT DOCUMENTS

| 8,349,239 B2 | 1/2013 | Hopkins et al. |
| 9,126,365 B1 | 9/2015 | Mark et al. |

(Continued)

FOREIGN PATENT DOCUMENTS

| WO | WO04045834 | 6/2004 |
| WO | WO06020685 | 2/2006 |

OTHER PUBLICATIONS

International Search Report/Written Opinion dated Dec. 2, 2016 by the European Patent Office; 23 pages.

(Continued)

*Primary Examiner* — Bernard G Lindsay
(74) *Attorney, Agent, or Firm* — Fish & Richardson P.C.

(57) ABSTRACT

Methods, systems, and apparatus, including computer programs encoded on a computer storage medium, for a multi-tool additive manufacturing system that executes in a three-dimensional build volume. In one aspect, a system includes a build platform; a support; a first robot coupled with the support and configured to operate in a build volume defined by the build platform, wherein the first robot includes a first additive manufacturing tool; a second robot coupled with the support and configured to operate in the build volume, wherein the second robot includes a second additive manufacturing tool; wherein the first robot and the second robot are programmed to coordinate simultaneous application; and wherein a first tool path of the first additive manufacturing tool in the first region abuts or overlaps with a second tool path of the second additive manufacturing tool in the second region so as to form a bond.

17 Claims, 16 Drawing Sheets

(51) Int. Cl.
  *B29C 64/118* (2017.01)
  *B29C 64/245* (2017.01)
  *B29C 64/393* (2017.01)
  *B29C 64/106* (2017.01)
  *B33Y 10/00* (2015.01)
  *B33Y 30/00* (2015.01)
  *B33Y 50/02* (2015.01)

(52) U.S. Cl.
  CPC .......... *B29C 64/386* (2017.08); *B29C 64/393* (2017.08); *B29C 64/106* (2017.08); *B33Y 10/00* (2014.12); *B33Y 30/00* (2014.12); *B33Y 50/02* (2014.12); *G05B 2219/49007* (2013.01); *Y02P 80/40* (2015.11)

(56) References Cited

U.S. PATENT DOCUMENTS

| | | |
|---|---|---|
| 9,555,545 B2 | 1/2017 | Linnell et al. |
| 9,701,018 B2 | 7/2017 | Linnell et al. |
| 10,073,434 B1* | 9/2018 | Hollander ............... G05B 19/31 |
| 2009/0082891 A1 | 3/2009 | Tang et al. |
| 2012/0133080 A1* | 5/2012 | Moussa .................. B33Y 10/00 264/308 |
| 2014/0291893 A1* | 10/2014 | Hopkins ............ G05B 19/4099 264/308 |
| 2015/0096266 A1 | 4/2015 | Divine et al. |
| 2015/0148951 A1 | 5/2015 | Jeon et al. |
| 2015/0231827 A1 | 8/2015 | Uzan et al. |
| 2016/0221259 A1* | 8/2016 | Kobida ................. B29C 64/106 |

OTHER PUBLICATIONS

Assembled Printrbot Simple, https://printrbot.com/shop/assembled-simple-metal; Sep. 8, 2016, 8 pages.

Unknown author, "Fused filament fabrication—Wikipedia," (Jun. 13, 2018) [online] (retrieved from https://en.wikipedia.org/wiki/Fused_deposition_modeling), 12 pages.

Unknown author, "Assembly line—Wikipedia," (Jun. 13, 2018) [online] (retrieved from https://en.wikipedia.org/wiki/Assembly_line), 10 pages.

Unknown author, "3D printing—Wikipedia," (Jun. 13, 2018) [online] (retrieved from https://en.wikipedia.org/wiki/3D_printing), 23 pages.

* cited by examiner

COORDINATED MULTI-TOOL ADDITIVE MANUFACTURING METHOD

CROSS REFERENCE TO RELATED APPLICATION

This application is a U.S. National Phase application of PCT/US2016/051163 filed Sep. 9, 2016, which claims the benefit under 35 U.S.C. § 119(e) of U.S. Patent Application No. 62/217,452 entitled, "MULTI-TOOL MANUFACTURING SYSTEM", filed Sep. 11, 2015, which is incorporated by reference herein.

BACKGROUND

This specification relates to an additive manufacturing system.

Assembly line manufacturing is a manufacturing process in which parts are added as the semi-finished manufacture moves from workstation to workstation. Different tools that perform different functions are stationed in different workstations along an assembly line. Each manufacture travels sequentially from one workstation to another and from one tool to the next to complete the assembly process.

One tool can be an additive manufacturing system. Additive manufacturing (AM), also known as solid free form fabrication or 3D printing, refers to any manufacturing process where three-dimensional (3D) objects are built up from raw material (generally powders, liquids, suspensions, or molten solids) in a series of two-dimensional layers or cross-sections. An example of additive manufacturing is Fused Filament Fabrication (FFF). Traditionally, FFF uses a single print head to lay down material, such as a plastic filament or metal wire that is unwound from a coil, in layers to produce a manufacture.

SUMMARY

This specification includes technologies relating to a multi-tool additive manufacturing system that executes in a three-dimensional build volume. In general, one or more aspects of the subject matter described in this document can be embodied in a system that includes a build platform; a support associated with the build platform; a first robot coupled with the support and configured to operate in a build volume defined by the build platform, wherein the first robot includes a first additive manufacturing tool that is movable in three or more different directions relative to the build platform; and a second robot coupled with the support and configured to operate in the build volume, wherein the second robot includes a second additive manufacturing tool that is movable in three or more different directions relative to the build platform; wherein the first robot and the second robot are programmed to coordinate simultaneous application of the first additive manufacturing tool and second additive manufacturing tool in respective first and second regions in the build volume to form respective first and second sections of a three dimensional (3D) part; and wherein a first tool path of the first additive manufacturing tool in the first region abuts or overlaps with a second tool path of the second additive manufacturing tool in the second region so as to form a bond between the first section of the 3D part and the second section of the 3D part.

These and other embodiments can optionally include one or more of the following features. The first region and the second region can be 3D regions, and the bond between the first section of the 3D part and the second section of the 3D party can include a set of seams that are not aligned with each other. The first robot can perform operations in the first 3D region without interfering with the second robot performing operations in the second 3D region.

The first manufacturing tool and second manufacturing tool can be interchangeable and can be selectable from a group of interchangeable manufacturing tools that can include at least one additive manufacturing tool, at least one subtractive manufacturing tool, and at least one milling tool. The first robot can include a first carriage configured to receive any of the manufacturing tools of the group, and the second robot can include a second carriage configured to receive any of the manufacturing tools of the group. The at least one additive manufacturing tool can include a Fused Filament Fabrication (FFF) three-dimensional (3D) printer.

The support can include a track that is a circular arc. The support can include tracks on opposite sides of the build platform where the first robot is coupled with a first track on one side and the second robot is coupled with a second track on a side opposite the one side. The first and second robots can be in a cantilevered geometry and can be coupled to one or more tracks. The support can include a magnetic surface where the first and second robots are coupled with the support by magnetic attraction.

At least one of the first robot, the second robot, or a third robot can be configured to move the 3D part on the build platform to a new position for one or more additional manufacturing operations to be performed on the 3D part. The one or more additional manufacturing operations can include subtractive manufacturing, further additive manufacturing on the 3D part, or connecting the 3D part to another part.

The 3D part can have a plurality of perimeters including one or more inner perimeters and an outer perimeter, where the seams of the one or more inner perimeters are in different locations than seams of the outer perimeter.

In general, in another aspect, the subject matter described in this document can be embodied in a method that includes receiving a three-dimensional model of an object; slicing the three dimensional model of the object into a plurality of layers; determining two or more portions of a first layer of the plurality of layers and two or more portions of a second layer of the plurality of layers, each portion corresponding to an area of the object, wherein each portion of the second layer corresponds to an area that is different than areas corresponding to the portions of the first layer; assigning the two or more portions of each of the first and second layers to two or more additive manufacturing robots; generating toolpath information for the object based on the portions of the first and second layers, wherein the toolpath information includes data defining tool paths that are a specified distance apart for adjacent portions in the first and second layers such that the adjacent portions bond at an edge; and providing the generated toolpath information to the two or more additive manufacturing robots, wherein each additive manufacturing robot is configured to move independently and without interference from another additive manufacturing robot.

Various implementations of the subject matter described in this specification can be implemented to realize one or more of the following advantages. The system can include multiple independent robots that perform coordinated activities. Note that robots can perform operations including 3D printing, milling, assembly, hot staking, part removal or other manufacturing processes. The multiple independent robots can perform the coordinated activities in a three-dimensional build volume. The multiple independent robots can share the three-dimensional build volume or each independent robot can operate within a particular region in the build volume that does not overlap with another region in the build volume. For example, each independent robot can move in three or more directions along three or more axes. Additionally, the multiple independent robots can be interchangeable allowing different robots and different types of robots to be integrated into the system to perform different coordinated activities. For example, a first robot on a first carriage can perform additive manufacturing within a first region of the build volume and form a portion of a printed part, a second robot on a second carriage can move the portion of the printed part to a second region of the build volume where a third robot can perform additional manufacturing on the printed part, such as subtractive manufacturing or injection molding. When performing additive manufacturing, the system can minimize or eliminate visible seams while strengthening the seams between build portions and reduce fabrication time by using multiple additive manufacturing robots that operate simultaneously in contiguous regions of a single printed part without colliding.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
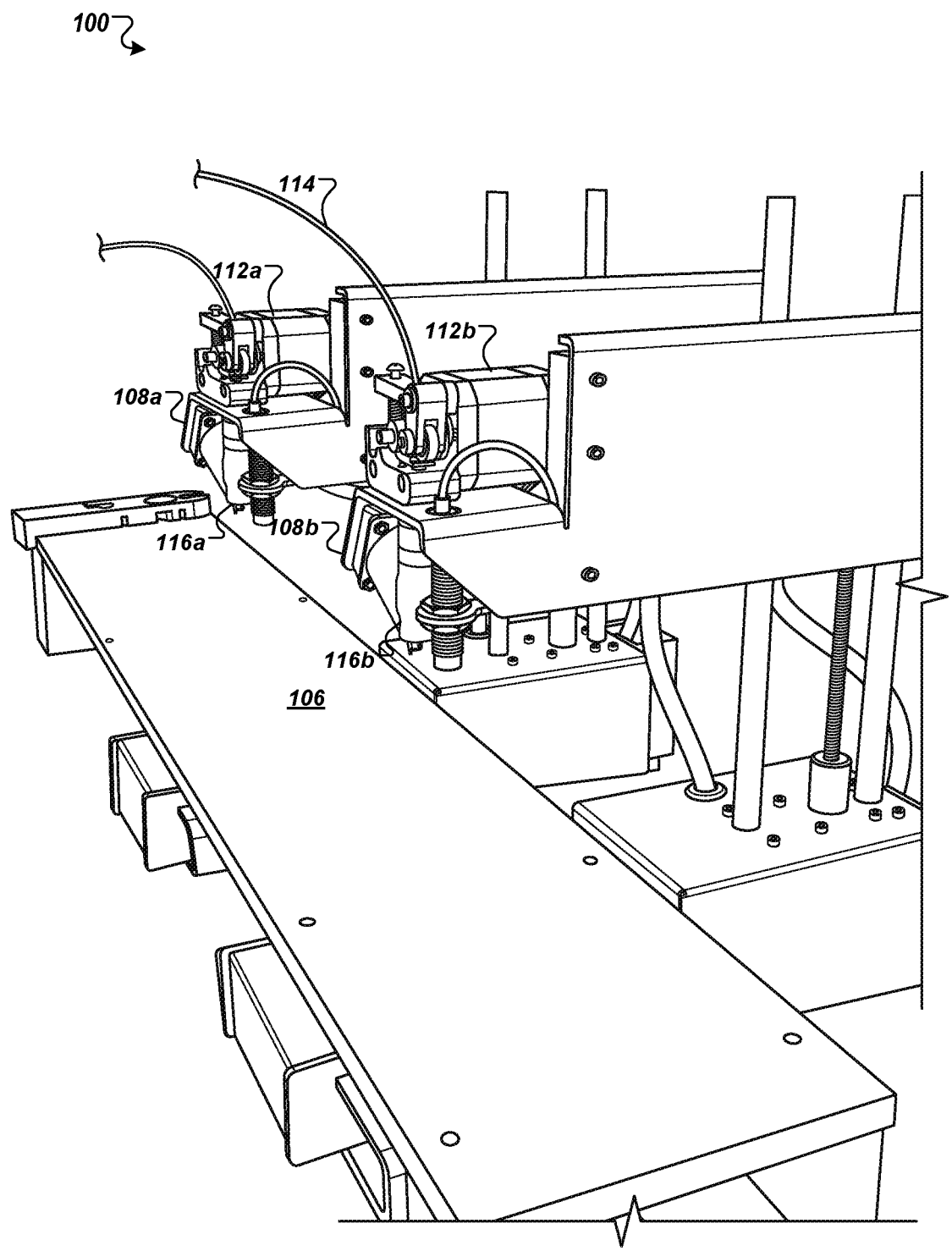
FIG. 1A shows an example of a multi-tool manufacturing system.

FIG. 1A shows an example of a multi-tool manufacturing system 100, e.g., two fused filament fabrication (FFF) systems. The multi-tool manufacturing system 100 includes a build platform 106, one or more robot carriages 108a-108b, one or more platform carriages, e.g., platform carriage 110 of FIG. 1B, one or more robots 112a-112b, and a support, e.g., support 118 of FIG. 1B. In some implementations, the multi-tool manufacturing system 100 can include an enclosure that houses the build platform and the robots. The enclosure can surround or cover the entire build area and can be climate controlled. For example, the enclosure can be a chamber or building that surrounds the entire build area and has climate control. In some implementations, the enclosure does not surround or cover the entire build area.

The multi-tool manufacturing system 100 can include a build platform, e.g., build platform 106, that can be made of metal, glass, or other suitable material. The build platform 106 can be of any shape or size. For example, the build platform can be circular, e.g., build platform 106 as shown in FIG. 1D. In some implementations, the build platform 106 is static. In other implementations, the build platform 106 is interchangeable, moveable, or otherwise configurable. For example, the build platform 106 can be an unheated build platform that can be replaced with a heated build platform. A heated build platform can have a temperature monitor to control the release of heat on the build platform. In additive manufacturing, a heated build platform can reduce warping in fabricated printed parts by reducing the temperature gradient in the printed part and thereby reducing uneven material stresses.

Figure 1B:
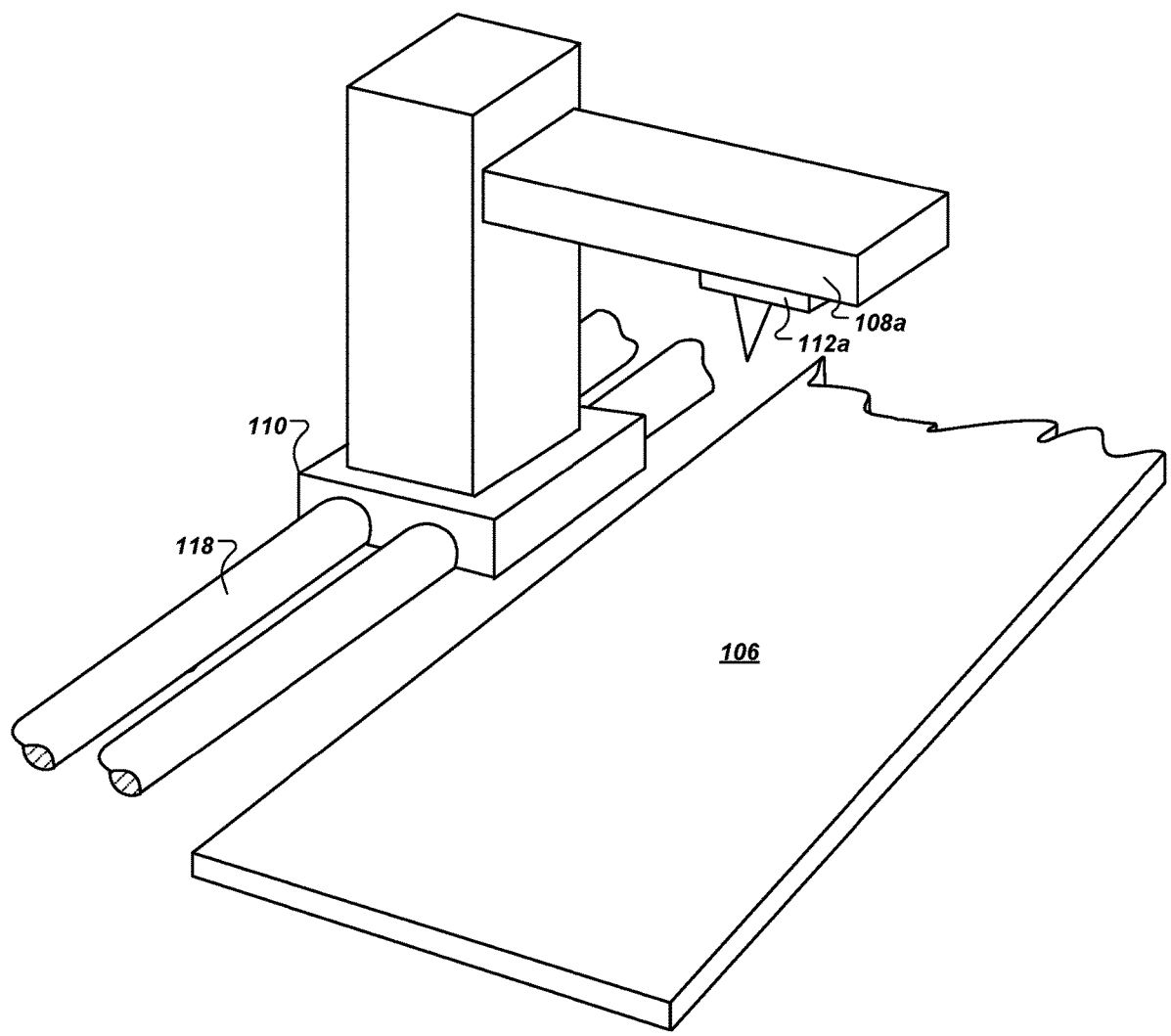
FIG. 1B shows an example of an additive manufacturing robot in a cantilevered geometry.

The multi-tool manufacturing system 100 can include a support, e.g., support 118 of FIG. 1B. A support can be any object that serves as a foundation for holding or carrying one or more robots, e.g., robots 112a-112b, along a build platform. For example, a support can be a magnetic surface that secures a robot by magnetic attraction or a gantry that has one or more tracks that carries the one or more robots. The support can be coupled to the build platform 106 and one or more platform or robot carriages, e.g., platform carriage 110 of FIG. 1B and robot carriages 108a and 108b, to move the one or more robots 112a and 112b.

A carriage is a movable part of the system that carries another part, such as a robot or a component of the robot, along one or more tracks. Each track can have at least one platform carriage that is coupled to the track and moves along the track. A platform carriage, e.g., platform carriage 110 of FIG. 1B, can include bearings that run along a track. In some implementations, two or more platform carriages can move along a single track. In other implementations, there are multiple tracks, and each track can have one or more platform carriages that move independently of each other, e.g., in different directions along the same or different axis. Different track configurations are described in more detail below in reference to FIGS. 1C-1E.

The multi-tool manufacturing system 100 can include two robots, e.g., robots 112a and 112b, that perform additive manufacturing. A robot is any automated independently moving mechanical sub-system that performs manufacturing operations. Different manufacturing operations can include, for example, additive manufacturing or 3D printing, milling, assembly, hot staking, subtractive manufacturing, part removal, bot-swapping, or other manufacturing processes. A bot-swapping robot is a robot that removes, replaces, or switches interchangeable robots within the system. A robot can refer to interchangeable robots, e.g., robots 112a and 112b, on robot carriages 108a and 108b, or it can refer to a combination of components, such as any combination of platform carriages, robot carriages, and the manufacturing tools of the robot. A robot can also refer to a manufacturing tool, i.e., an interchangeable robot can refer to an interchangeable manufacturing tool. A manufacturing tool is an instrument that is used to perform a manufacturing operation, e.g., a print head, a mill, or an assembly arm. The robot can be in a cantilevered geometry. That is, the robot can include a rigid structural member that projects from a support, e.g., as shown in FIG. 1B.

The robot carriages 108a and 108b can be configured to carry any one of the interchangeable manufacturing tools.

The group of selectable interchangeable manufacturing tools can include an additive manufacturing tool, subtractive manufacturing tool, a milling tool, and an assembly arm.

One or more manufacturing tools can be an additive manufacturing tool, e.g., an FFF system. Each robot can move independently or in conjunction with another robot in multiple directions, e.g., three or more directions along three or more axes. The robots can use the support, e.g., support 118 of FIG. 1B, one or more carriages, and one or more controllers, e.g., controllers 122a and 122b of FIGS. 1C and 1D, to move in the multiple directions along the different axes. The various directions that the robots can move is further described in detail below in reference to FIG. 2.

Multiple robots, e.g., robots 112a and 112b, can perform fused filament fabrication (FFF). FFF is an additive manufacturing technology that forms a printed part by depositing material, such as plastic, wax, or metal, on top or alongside the same material or a different material to form a joint by heat or adhesion.

One or more platform carriages that are coupled to a support can carry the one or more robots. The robots 112a and 112b can sit or rest in robot carriages 108a and 108b while carried by the one or more platform carriages.

The multiple robots can use a filament of a material 114 that is fed to a hot end 116a or 116b of an extruder. The hot end 116a or 116b can include a nozzle and a heating element to deposit material 114, e.g., plastic, wax, or metal. The filament can be unwound from a coil and supplied to the hot end. In some implementations, the hot end can turn the flow of the filament on and off and can control the rate of flow of the filament into the nozzle using, for example, a drive gear that pushes the filament into the nozzle at a controlled rate. The hot end can use, for example, a torque and pinch system to feed and retract the filament in precise amounts for extrusion. The heating element can melt the filament to a useable temperature that is forced out of the nozzle. The multiple robots can simultaneously add the filament to contiguous regions of a 3D object to fabricate the 3D object. The robots can use an algorithm that prevents crashing of the robots and that shifts the extent of the regions for each robot on each subsequent layer so that the seams are not aligned and do not create a weak area in the 3D object. The 3D object can have multiple perimeters, e.g. one or more inner perimeters and an outer perimeter. The seams of the inner perimeter can be in different locations than the seams of the outer perimeter. A controller can direct the robot to the correct X/Y/Z position for depositing the filament.

Figure 1C:
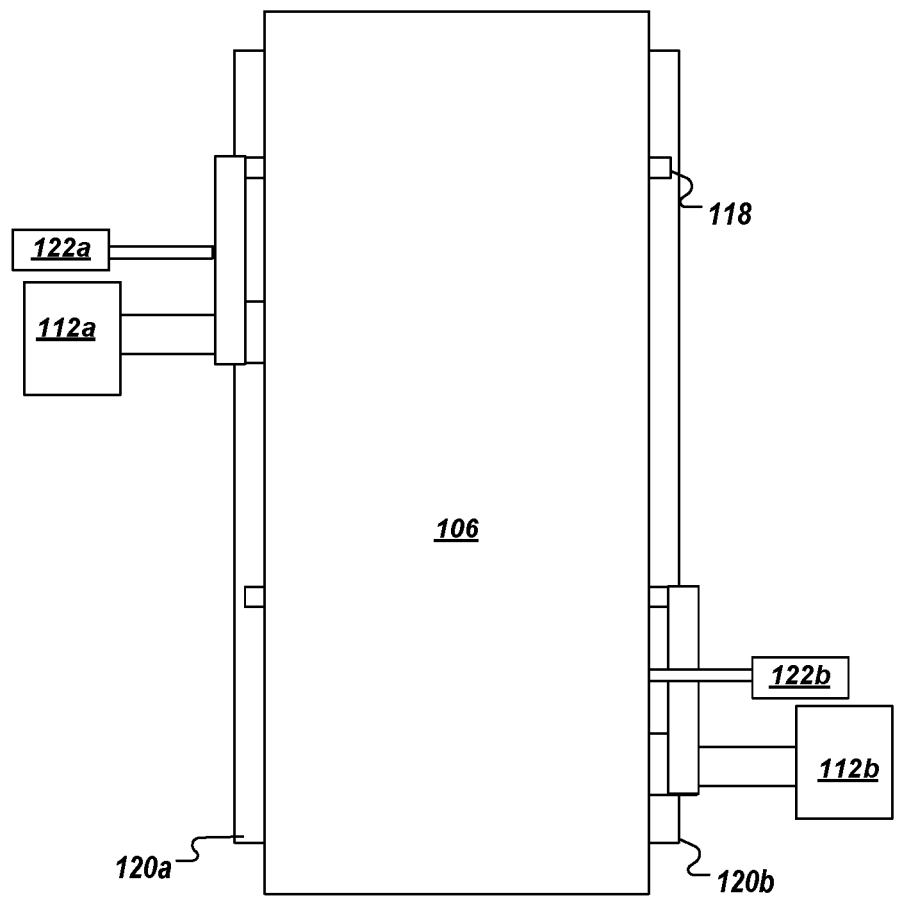
FIGS. 1C-1E are schematic diagrams showing an example of a multi-tool manufacturing system in different track configurations.
Figure 1D:
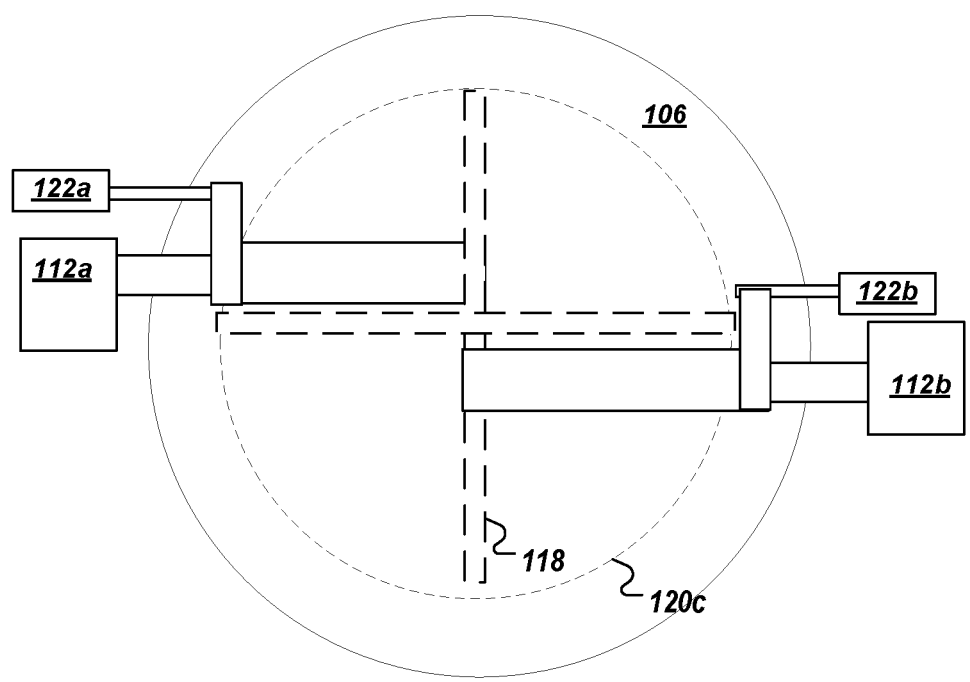
Figure 1E:
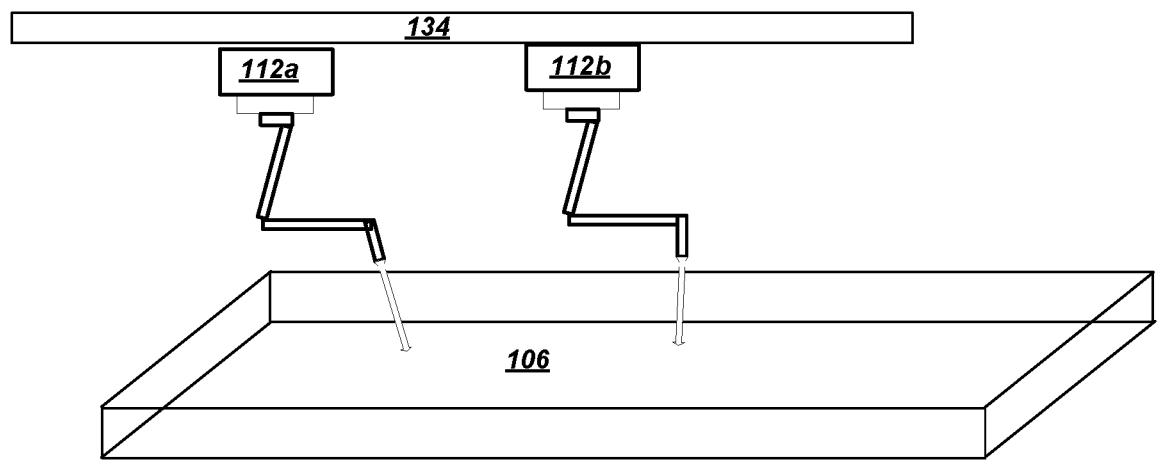

FIGS. 1C-1E are schematic diagrams showing an example of a multi-tool manufacturing system in different track configurations. The one or more robots 112a and 112b can move in a build volume that is within a region that is approximately within the dimensions of the periphery of the build platform 106. A region can be within a three-dimensional build volume or a two-dimensional area, such as a flat planar surface. The build platform 106 can be coupled to a support 118, e.g., a gantry that has one or more tracks 120a-120c. The one or more tracks, e.g., tracks 120a or 120b, can run parallel to the build platform 106 and can be on one, either, or both sides of the build platform 106. The one or more tracks, e.g., track 120c, can be circular, partially circular, or other shape. One or more controllers, e.g., controllers 122a or 122b, can be associated with the one or more robots 112a and 112b and can move the one or more robots 112a and 112b within the build volume using tracks 120a-120c.

The multi-tool manufacturing system does not necessarily need a gantry, track, or carriage. For example, as shown in FIG. 1E, the multi-tool manufacturing system can magnetically secure a robot (e.g., robots 112a and 112b by magnetic attraction to a ceiling 134 or a support on the ceiling 134 over the build platform 106) allowing the robot to traverse the build platform 106 without a fixed or static mechanism.

Figure 1F:
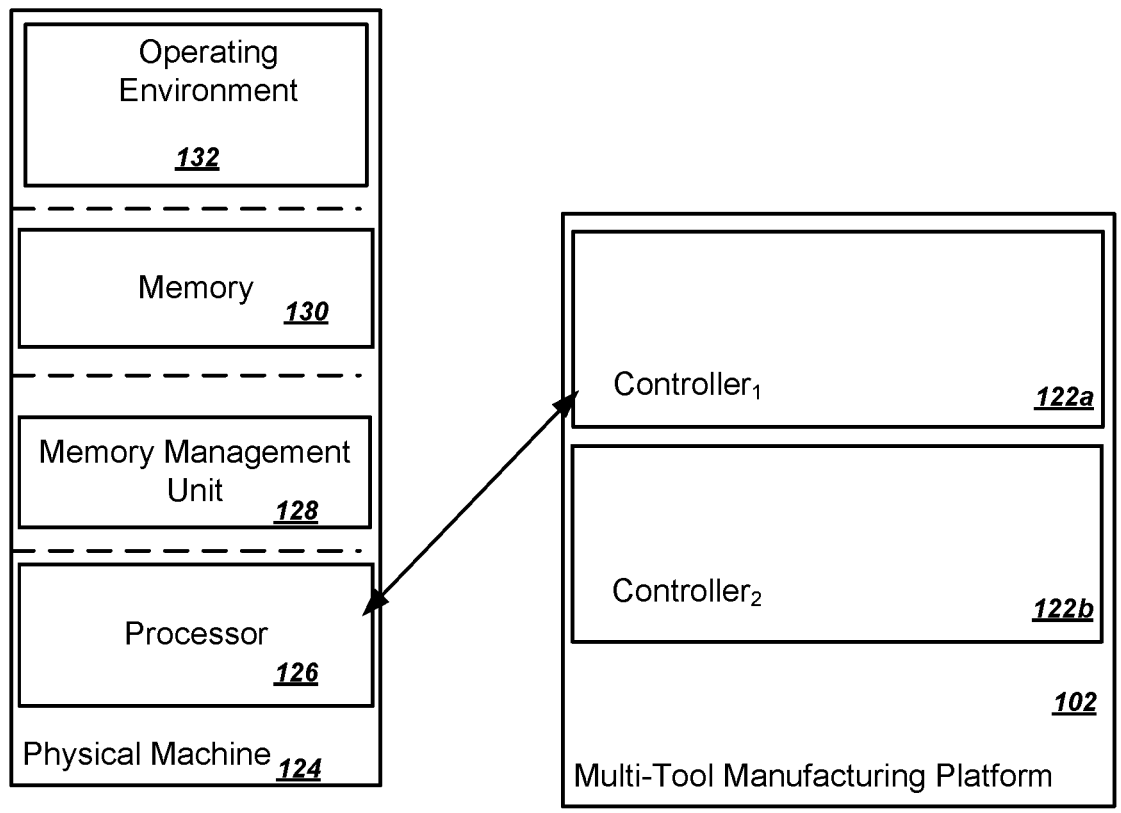
FIG. 1F is a schematic diagram showing an example computer system used to implement one or more controllers in the multi-tool manufacturing system of FIGS. 1A-1D.

FIG. 1F is a schematic diagram showing an example computer system used to implement the one or more controllers in the multi-tool manufacturing system of FIGS. 1A-1D. The one or more controllers, e.g., controllers 122a and 122b, can execute on one or more physical machines, e.g., physical machine 124, that have an operating environment e.g., operating environment 132. A physical machine includes physical hardware, for example, a processor (CPU) 126, a memory management unit (MMU) 128, and memory 130, e.g., Random Access Memory (RAM), hard disk, flash memory, or a combination of these. An operating environment is a set of configurations, software applications, operating system, and other aspects of a software framework.

The one or more controllers, e.g., controllers 122a and 122b, can each individually control a single robot or multiple robots, and can receive instructions that control the movement of a respective robot. For example, a controller can receive instructions to move a first robot along a direction parallel to a build platform or move the first robot at a 30 degree angle to the build platform, such as build platform 106 of FIG. 1A. In some implementations, controller 122a or 122b uses pre-programmed instructions to move the robots. The pre-programmed instructions can include fabrication information, such as toolpath information. In some implementations, a controller 122a or 122b is event-driven. That is, a controller can use sensors to determine the location of the object and the location of the other robots in the build volume and, based on the information from the sensors, coordinate the movement of the robots to avoid collision.

In some implementations, the robots can automatically place objects made, modified, or located in one region of the build volume into another region of the build volume to perform additional manufacturing operations including, for example, additive manufacturing, subtractive manufacturing, or mechanically connecting the object to another object. For example, a first robot can fabricate an object in a first region, e.g., by performing additive manufacturing. Then, a second robot can move the object to a second region, e.g., by picking up and placing the object in the second region or by transitioning the object to the second region by another means, where the second robot or a third robot can inject material into the object, add additional material to the object, or join the object to another object. In another example, the first robot fabricates a portion of the object that has a wall that encloses a volume, and the second robot fills or partially fills the enclosed volume by dispensing an expanding foam or other material, such as a thermoset polymer. Each robot can perform different operations, such as additive or subtractive manufacturing, or can perform a similar operation on the object being assembled. The robots can perform other operations including placing a printed part into contact with another separate part or connecting the printed part to another part, e.g., by connecting the printed part to another part using a fastener.

In some implementations, each of the robots 112a and 112b has its own controller 122a or 122b. Further, in some implementations, one or more of the controllers 122a and 122b can communicate (e.g., by wireless network) with one or more other controllers, and the various controllers 122a and 122b can coordinate their activities using decentralized control or by using a central controller to provide instructions to the rest.

The system can coordinate the movements of the first robot 112a and the second robot 112b to avoid collision and to perform operations on the entire build volume. The system can coordinate the movements by defining multiple regions within the build volume and coordinating the timing and inter-region transitions of the robots. The system can define a job zone that represents the build volume in which manufacturing actions of a robot are performed and an exclusion zone that represents the physical area that a robot occupies while acting in the job zone. The system prevents the exclusion zone of a second robot from intersecting with the exclusion zone of a first robot while either the first or second robot are operating within a region of the build volume or transitioning between regions.

Figure 2:
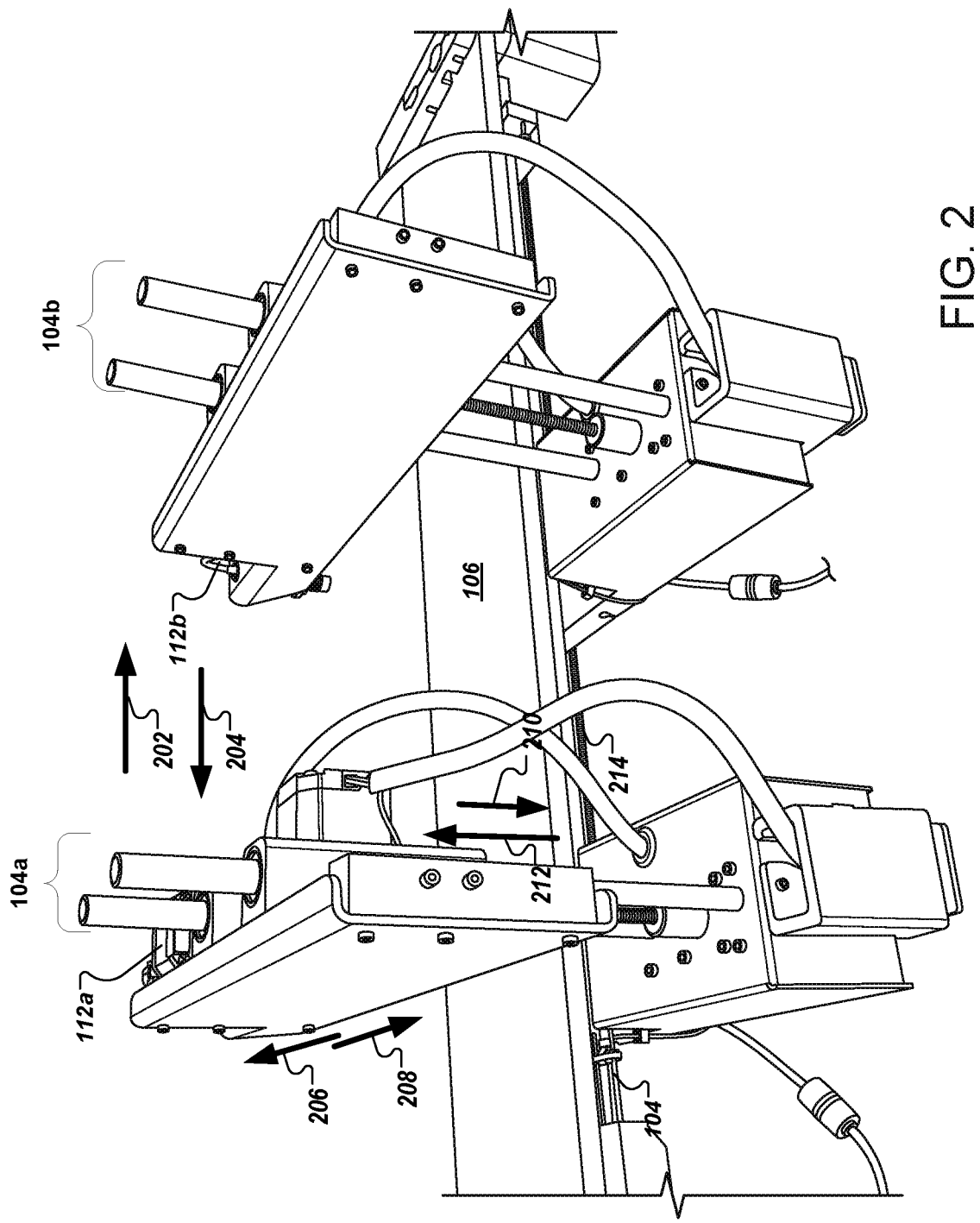
FIG. 2 shows an example of robots moving in multiple directions in a build volume.

FIG. 2 shows an example of robots moving in multiple directions in a build volume. One or more controllers can direct robots in the multi-tool manufacturing system 100 to move in multiple directions along the same or different axes. For example, a first robot and second robot can move in three or more directions along three or more axes in a build volume. Each axes can be an offset angle from another axis.

The first robot 112a and second robot 112b can move in a first direction, such as along an axis that is parallel to the build platform. The first robot 112a can travel, for example, from left to right along the direction indicated by arrow 202, on the track 214 that is parallel to the build platform 106. A second robot 112b can move along another track or on the same track along the same axes but in a different direction of the first robot, for example, from right to left along the direction indicated in arrow 204. The second robot can also move on the same axes and in the same direction as the first robot.

The first robot 112a and second robot 112b can move in a second direction, which is different from the first direction and on a different axis. The second direction can be along an axis that is perpendicular to the build platform, e.g., along the direction indicated by arrows 206 and 208, or at an angle to the build platform. Robots 112a and 112b can move perpendicular to the build platform using the one or more robot carriages.

Additionally, the first robot 112a and second robot 112b can move in a third direction, which is different from the first and second directions and their corresponding axes. The third direction can be along an axis that is vertical to the build platform or at an angle relative to the build platform, e.g., along the directions indicated by arrows 210 and 212.

The various directions that the robots travel can be different for each robot. The robots can move simultaneously or sequentially using the one or more controllers. For example, one or more controllers can control the movements of the first robot 112a and second robot 112b. A single controller can control all robots in the system or each controller can control a single robot. Each robot can move independently. That is, the first robot 112a can move in one direction while the second robot 112b moves in a different direction. One robot can also remain stationary while another moves in a particular direction.

Figure 3A:
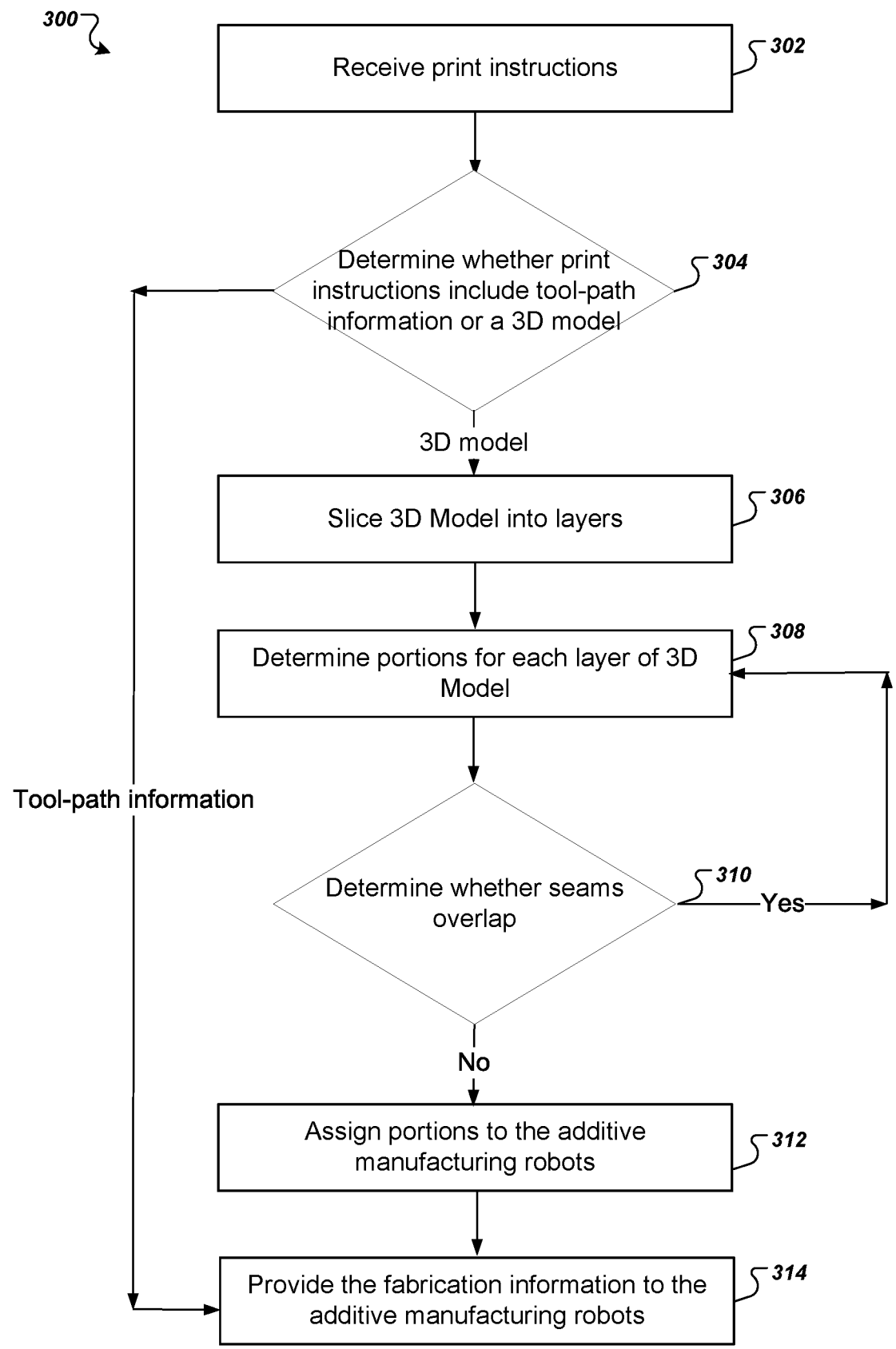
FIGS. 3A-3B show an example of a process for layering material in an additive manufacturing process.
Figure 3B:
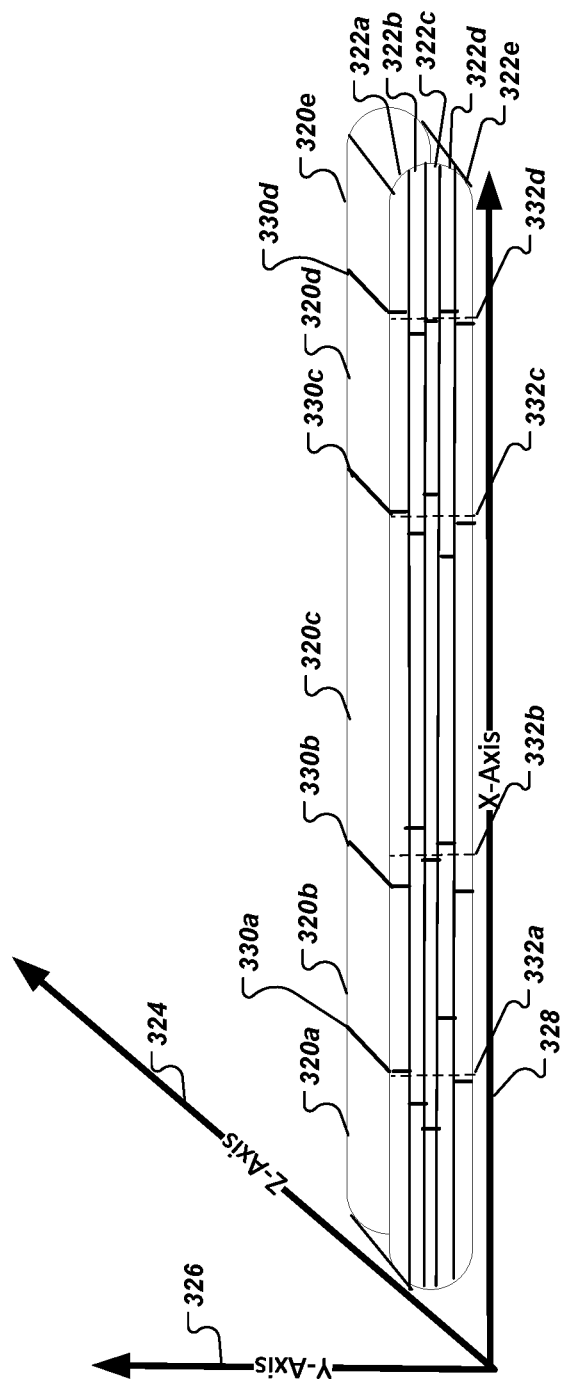

FIGS. 3A-3B show an example of a process 300 for layering material in an additive manufacturing process using two or more additive manufacturing robots. The process 300 is performed by a system of one or more computers. For example, a multi-tool manufacturing system 100, appropriately programmed, can perform the process 300 using additive manufacturing robots, e.g., robots 112a and 112b of FIG. 1A.

The system receives print instructions to fabricate the object at 302. The print instructions can include pre-programmed toolpath information to control two or more additive manufacturing robots. Toolpath information includes information describing the route each of the two or more additive manufacturing robots travel in the build volume to fabricate the object and the amount of filament to deposit to form each layer of the object. The additive manufacturing robots can be FFF printers.

In some implementations, the print instructions can include a 3D model instead of pre-programmed toolpath information. The system can use the 3D model to generate fabrication information for the object that includes the toolpath information. The 3D model can be created with a computer aided design package, 3D scanner, or via a digital image. The print instructions can be a file, for example, an ".STL" or an ".OBJ" formatted file, and can include, for example, a 3D solid or watertight mesh of the object. A watertight mesh of the object is an interwoven or intertwined structure that has no holes, cracks, or missing features. The file can include instructions that describe the thickness of each layer of filament. The information describing the thickness of each layer of filament can include the amount of filament to dispense at a particular location along the route traveled by the additive manufacturing robots.

The system determines whether the print instructions include toolpath information or a 3D model at 304. If the print instructions included toolpath information, the system provides the toolpath information to the two or more additive manufacturing robots at 312. If the print instructions included a 3D model, the system can generate the toolpath information from the 3D model.

The system can slice the 3D model into a series of layers, e.g., layers 322a-322e, at 306. The system can slice the 3D model into layers that are planar, for example, by performing a planar intersection of the 3D model. The system can determine the thickness of each layer based on user input or information in the file. In some implementations, one more of the layers need not be planar, and 3D tool paths can be used.

The system can divide a first layer, e.g., one of the layers 322a-322e, into multiple portions, e.g., layer 322a has portions 320a-320e, along one or more seams, e.g., seams 330a-330d, at 308. The system can divide the layers 322a-322e along one of the axes, e.g., the z-axis 324, y-axis 326, or x-axis 328 or at any other line or plane. For example, if a block 1×1×1 were cut in half about the x-axis, the system can create two objects of dimensions 0.5×1×1. The system can create multiple portions that are adjacent to each other in each layer. The adjacent portions can be a specified distance apart so that when the two or more additive manufacturing robots deposit filament at the edges of the adjacent portions the filament overlaps to bond or merge the adjacent portions at a seam. The filament deposited to form the edges overlap by an appropriate factor to sufficiently merge or bond the adjacent portions. The specified distance can be a threshold distance that is based on the diameter of the aperture of the nozzle of the additive manufacturing robots. In addition, some implementations can employ one or more nozzles and one or more hot ends as described in the U.S. Patent Application filed on Sep. 11, 2015, under 62/217,606, which is titled Narrow Angle Hot End for Three Dimensional (3D) Printer, and which is hereby incorporated by reference in its entirety.

A seam, e.g., one of the seams 330a-330d, is a location where filament extruded by a first additive manufacturing robot for a first portion in a build volume is joined by filament extruded for a second portion in the build volume. The second portion can be extruded from either the first or a second additive manufacturing robot. The system can coordinate the operation of each robot to perform operations in one or more regions of the build volume without interfering with each other. The seams join different portions of the object. Filament extruded by different robots can become chemically bonded, physically bonded or mechanically interlocked at seams 330a-330d where filament deposited by one robot can be deposited adjacent to or in contact with filament deposited by a different robot.

Figure 3C:
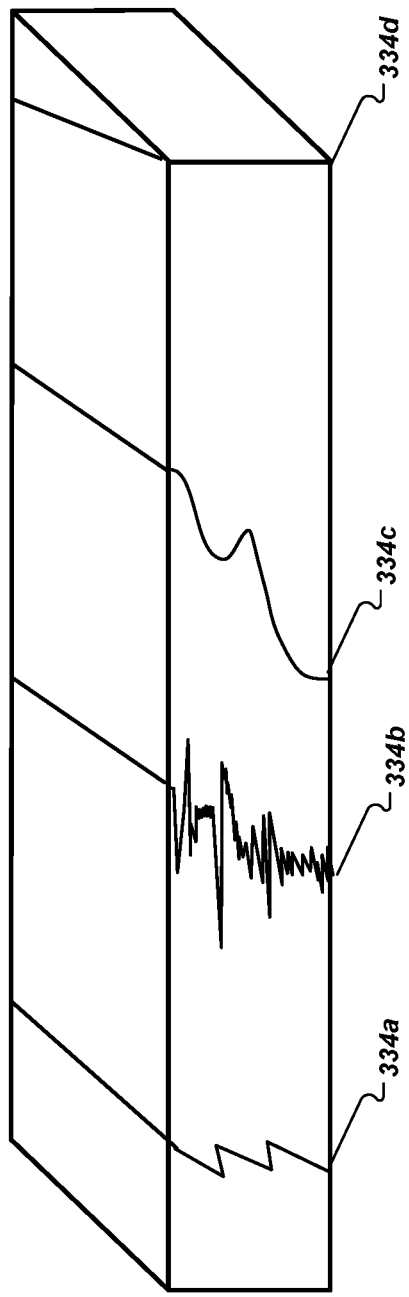
FIG. 3C shows an example of different types of seams in a fabricated object.

The seams of different layers stacked on top of one another can form a random or pseudo-random pattern, e.g., seam 334b of FIG. 3C. In other implementations, the seams form a non-repeating geometric pattern, e.g., seam 334c of FIG. 3C, or repeating geometric pattern, e.g., seam 334a of FIG. 3C. In other implementations, the seams form an approximation of a straight line or a seam at a corner of the object being manufactured, e.g., seam 334d of FIG. 3C.

The system determines the one or more seams based on one or more separation starting points, e.g., separation starting points 332a-332d, and a respective offset for each of the one or more separation starting points. A separation starting point is the location of two adjoining portions without deviation and can provide for the optimal print time. In some implementations, the one or more separation starting points are inputted by a user. In other implementations, the system can determine the separation starting point using load balancing information.

Load balancing information can include the estimated workload to fabricate the object and the average print speed of each additive manufacturing robot. The workload can be based on the number of layers that compose the 3D model of the object and the complexity of the 3D model. In other implementations, the workload can be based on the number of layers, the rate of extrusion of a filament, and the thickness of each layer. In some implementations, the average print speed can be pre-determined in the system.

The system can calculate the separation starting points by apportioning the overall workload among the additive manufacturing robots to minimize the overall print time of the object. The system determines an offset for each of the separation starting points. The offset can be determined globally for the entire object, specifically for one or more layers, or specifically for each separation starting point in a single layer. The offset can be based on input from a user or pre-determined. In some implementations, the system calculates the offset based on the difference between the estimated optimal print time calculated using the optimal seam locations and a threshold acceptable print time. The threshold acceptable print time can be a value inputted by the user. For example, if the threshold acceptable print time is thirty seconds and the optimal print time is twenty seconds, the combined offset for all the separation starting points can add at most an additional ten seconds of overall printing time.

The system calculates the location of the one or more seams using the separation starting points and the respective offsets. The system can determine whether a corner is within a threshold distance of a separation starting point. A corner can be a bend in a layer of the object that has specific characteristics, e.g., a radius less than four times the diameter of a nozzle aperture on one of the additive manufacturing robots or user-inputted characteristics. The threshold distance can be the offset. If the system determines that a corner is within the threshold distance of the separation starting point, the system locates the seam at the corner. The seam can be at the mid-point of the corner or at another point in the corner. The angles of the corner can be greater than 15 degrees and less than 345 degrees, and a radius of the corner measured at any angle can be less than four times a cross section of a nozzle aperture used by one of the additive manufacturing robots. If the system determines that there is no corner within the threshold distance, the system can calculate the location of the one or more seams as a function of the separation starting point and respective offset.

The system generates the two or more portions from the one or more seams in each layer. The locations of the seams define the boundaries of each portion. The system uses the two or more portions to define one or more toolpaths for the additive manufacturing robots to form each layer. For example, the system can assign a first portion and a third portion to a first additive manufacturing robot and a second portion and a fourth portion to a second additive manufacturing robot.

The system can determine whether the one or more seams in each layer are different than the one or more seams of an adjacent layer by comparing the locations of the one or more seams at the respective layers at 310. If the locations of the one or more seams for two adjacent layers are the same then the system re-determines the portioning of one of the layers by recalculating the offsets for the separation starting points of one of the layers.

If the system determines that the location of the one or more seams in each layer are different, the system generates the two or more portions of each layer from the one or more seams in each layer and assigns each portion to one of the additive manufacturing robots at 312.

The system generates fabrication information using the two or more portions and provides the fabrication information to the assigned additive manufacturing robots at 314. The fabrication information can include information that describes the boundaries of each portion of each layer in the build volume and the one or more locations of the seams within each layer of the sliced 3D model that represent the intersection of two portions within a particular layer. The fabrication information can be provided to two or more additive manufacturing robots each additive manufacturing robot forming different portions of the object.

The system can generate additional fabrication information for an outer shell or skin of the series of layers. The outer shell or skin is a geometric surface of the perimeter of the series of layers. The system can generate the additional toolpath information by determining an outline of the layer or stack of layers and creating an outer perimeter that is offset from the outline. The perimeter is a path a nozzle of an additive manufacturing robot takes to make an outer edge of extruded material approximately line up with the outline. The system can provide the generated additional fabrication information to one of the additive manufacturing robots for execution.

The system can generate the fabrication information for the object including the additional fabrication for the outer shell of the object using one or more additive manufacturing robots. For example, two or more additive manufacturing robots can be used to generate the series of layers that form the object and a single additive manufacturing robot can be used to generate the outermost shell. The different robots can work on different parts of the object simultaneously or sequentially.

Multiple robots can work in parallel in a shared build volume on one or more objects. The robots can be synchronized by defining multiple regions of the build volume, one or more zones associated with each robot, and coordinating the timing and inter-region transitions of the robots. The robots can be FFF printing robots, other type of robot fabrication systems, or a mix of different types of robots. The synchronization of the multiple robots is further described below.

An algorithm serves to allow multiple robots to work in parallel in a shared build volume on one or more parts. By defining multiple job zones and coordinating the timing and inter-zone transitions of robots, the robots can act on the entire build volume while avoiding collision. FIGS. 4A-4I show an example of a process used to synchronize two-robots for parallel task completion within a single shared build area. The two-robot approach can be extended to N robots. The robots can be FFF printing robots, or other type of robotic fabrication system, or a mix of types of robots.

Figure 4A:
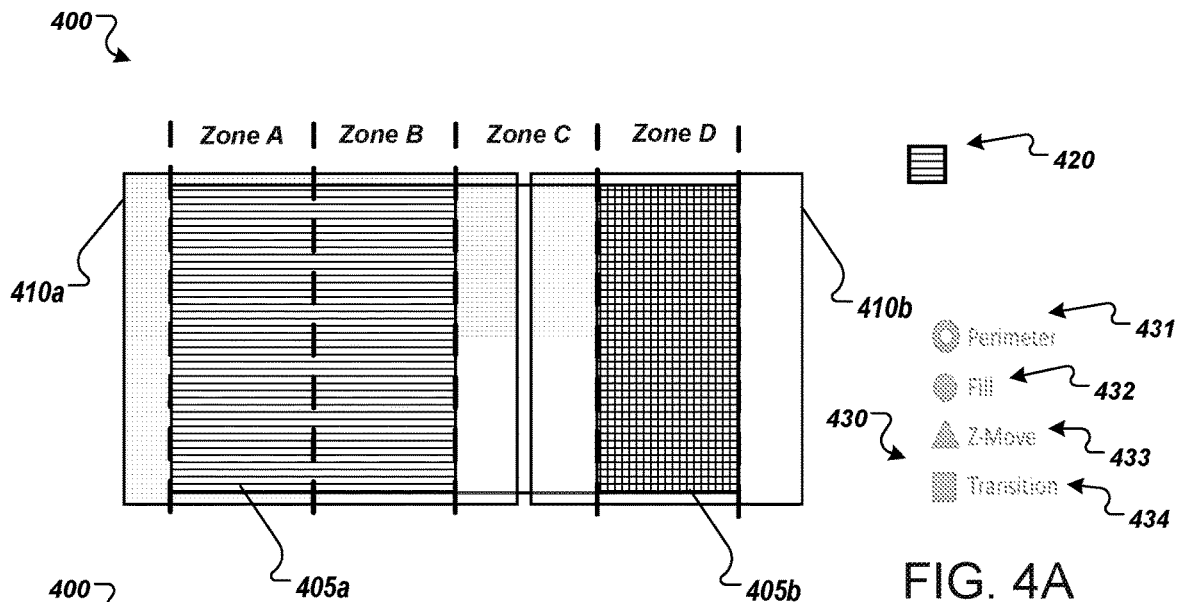
FIGS. 4A-4I show an example of a process used to synchronize two-robots for parallel task completion within a single shared build area.

The algorithm can be used if there are no fabrication steps that require a single robot to traverse the entire X-axis length of build volume. Each robot acts within two or more job zones as shown in FIG. 4A. A job zone 405a, 405b is defined as a region of build volume constrained by a given maximum and minimum X. For a robot with both local and global X-axis movement capability, the job zone 405a, 405b can also be defined as the region of build volume constrained by a maximum range the robot can reach without utilizing the coarse X-axis movement for a given position of the coarse X-axis.

FIG. 4A shows a top view of the fabrication area 400. The fabrication area 400 can be characterized along planes of a reference coordinate system, including X-axis, Y-axis, and a Z-axis that would be perpendicular to X-Y plane. As an example, fabrication area 400 can be described as being divided into four separate potential job zones of equal size, from left to right: Zone A; Zone B; Zone C; and Zone D. During the manufacturing, a first robot and a second robot each have designated job zones in which their respective manufacturing actions are performed. The job zone 405a corresponding to a first robot is illustrated using a striped pattern and job zone 405b for the second robot is illustrated using a checkered pattern. Each of the job zones, 405a, 405b represent the areas in which manufacturing actions are performed by the first robot and the second robot, respectively. In the example shown, the first robot is operating in both of the equal sized job zones (Zone A and Zone B, e.g., because the robot is transitioning from Zone B to Zone A) and thus has a larger job zone 405a currently defined for it, whereas the second robot is operating in Zone D only. The exclusion zones 410a, 410b represent the physical area that the robot can potentially occupy while acting in the job zone 405, and as a result, the exclusion zones 410a, 410b are avoided by the opposing robot. As shown, each robot has a respective exclusion area in the two-robot approach, with exclusion area 410a being the exclusion area associated with the first robot, and exclusion area 410b being an exclusion area associated with the second robot.

Additionally, legend 430 describes various symbols used in a job dependency graph 420. A job dependency graph 420 is a visual graph using various shapes and arrows to represent sequential ordering, and relationships between positions, movements, and actions of the robots in the illustrated two-robot approach. The legend 430 shows that dependency graph 420 can use various symbols, where each symbol represents a specific action taken by a robot during a manufacturing cycle in the two-robot approach. The legend 430 shows that dependency graph 420 can include a symbol for perimeter 431, which is for example, movement that a robot can make along a path (e.g., while extruding material) to print an outer edge of an object being manufactured. A perimeter 431 movement can be represented by a circle with a hallowed center. The legend 430 also shows fill 432, which is an action that can be represented by a filled circle. Fill 432 indicates that either the first robot or second robot is filling, or partially filling, within an outer edge of the object, such as by dispensing an expanding foam or other material within an enclosed volume. The legend 430 also shows that a dependency graph 420 can include a symbol representing a Z-move 433 using a triangle to indicate movement of the robot in the Z direction, for example to print a next layer of fabrication. Also, legend 430 shows that a dependency graph 420 can include a symbol, specifically a square, for transition 434 where a robot moves to transition between job zones. As an example, the dependency graph 420, shown in FIG. 4A, indicates that the first robot is to perform a transition from printing in Zone B to printing in Zone A, in the example of the two-robot approach. In an example movement, a coarse axis can move the entire robot between zones. Then, with the coarse axis locked, the fine axis can perform fabrication within the zone. By locking the coarse axis, it would be possible to reference a precise datum to allow the fine axis to compensate for any error in the park position of the coarse axis. The alternative mode of movement is for the coarse axis to move at the same time as the fine axis. The resulting motion can be the sum of the two motions. This may be necessary for features that run through multiple job zones.

FIG. 4A shows an example of a transition of the first robot from Zone B to Zone A, that can be implemented during two-robot synchronization. While the first robot is moving from Zone B to Zone A, which is indicated by the job zone 405a, the second robot has to avoid being in Zone C in order to avoid collision with the first robot since the first robot's exclusion area 410a overlaps with Zone C. The second robot is located in a Zone D, as shown using job zone 405b. If any operations require the first robot to access Zone A and Zone B at the same time, for instance, those operations can be performed at this same time.

Figure 4B:
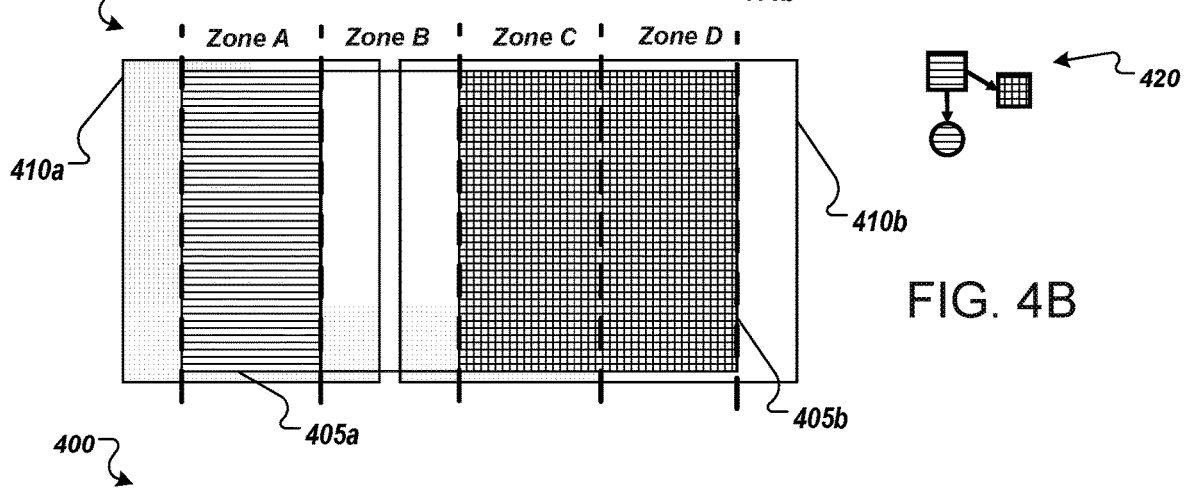

FIG. 4B shows an example of a transition of the second robot to Zone C, while fabrication is occurring Zone A using the first robot. For example, while the first robot is fabricating in Zone A, represented by the job zone 405a, the second robot is free to transition from Zone D to Zone C, as the first robot's exclusion area 410a does not cover these areas. As an example, the second robot does not begin transition within its exclusion area 410b until the previous job of the first robot is complete. The dependency graph 420 represents this stage of the two-robot approach graphically. Also, arrows between shapes shown in dependency graph 420 represent dependency of a "child" job from previous, or "parent" job, where each job will start when its parent jobs are completed. A job can be a child of the previous job of the same robot, and may also be a child of a job performed by another robot.

Figure 4C:
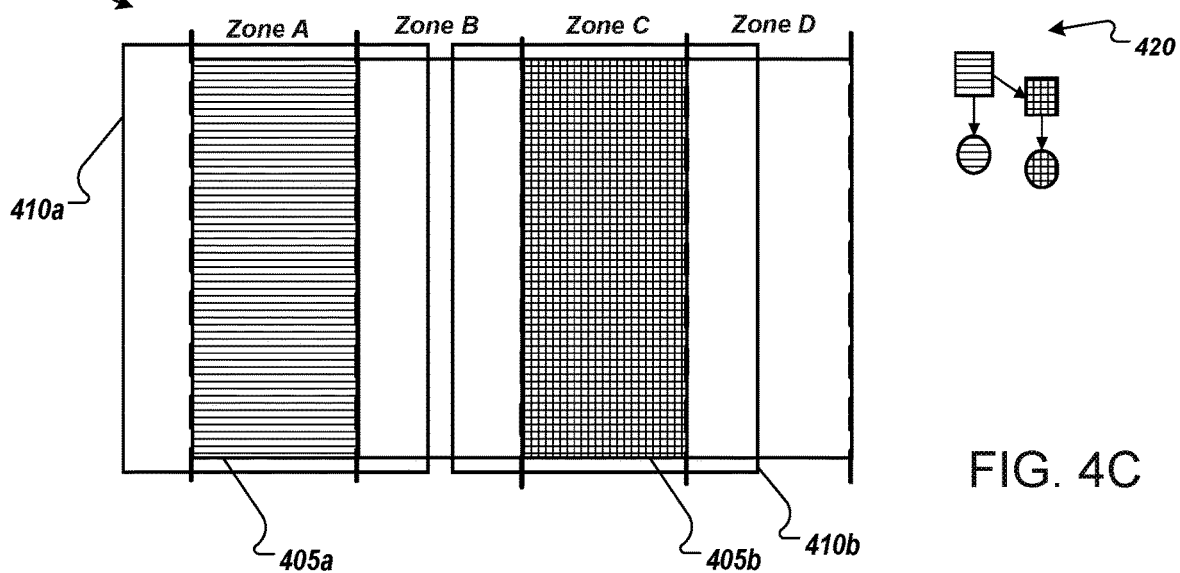

FIG. 4C shows an example step of the two-robot approach while fabrication is occurring in two zones, namely Zone A and Zone C. As illustrated, the first robot is positioned in Zone A, as shown by the corresponding location of job zone 405a, and continues fabricating in Zone A. Also the second robot begins fabricating in Zone C, illustrated by job zone 405b. The dependency graph 420 represents this portion of the two-robot approach graphically.

Figure 4D:
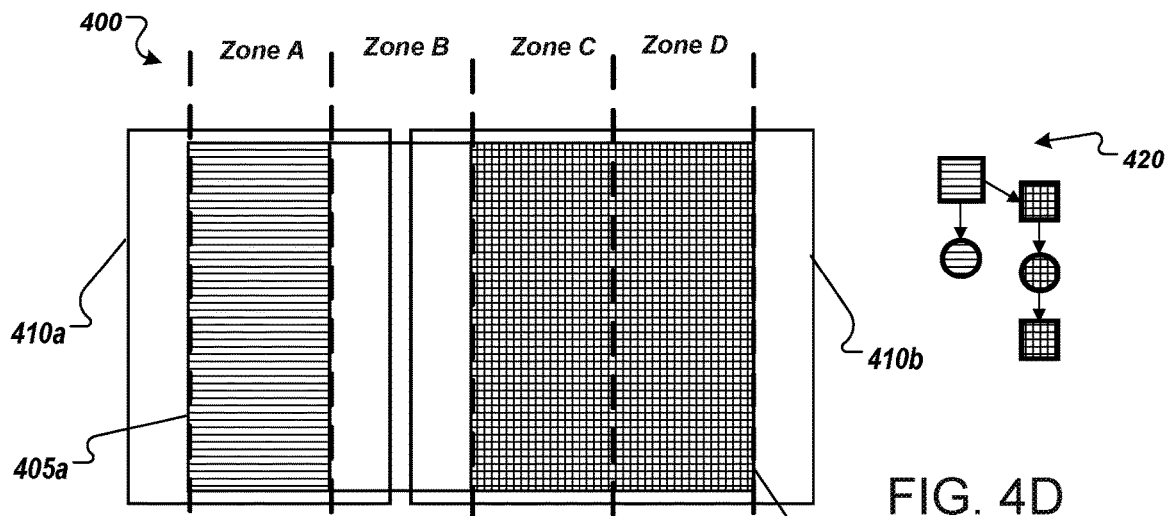

FIG. 4D shows an example step of the two-robot approach while fabrication is occurring Zone A for the first robot, as the second robot is transitioning from Zone C to Zone D. In continuing with the example, after the second robot has finished fabricating in Zone C it can transition back to Zone D, illustrated by the job zone 405*b*. If the first robot has finished fabricating in Zone A, as shown by its location of job zone 405*a*, it waits until the second robot has transitioned completely to Zone D. If any operation requires the second robot to access Zone C and Zone D at the same time, those operations can be done at this time, as illustrated by the second robot's exclusion zone 410*b* covering these sections of the fabrication area 400. The dependency graph 420 represents this stage of the two-robot approach graphically.

Figure 4E:
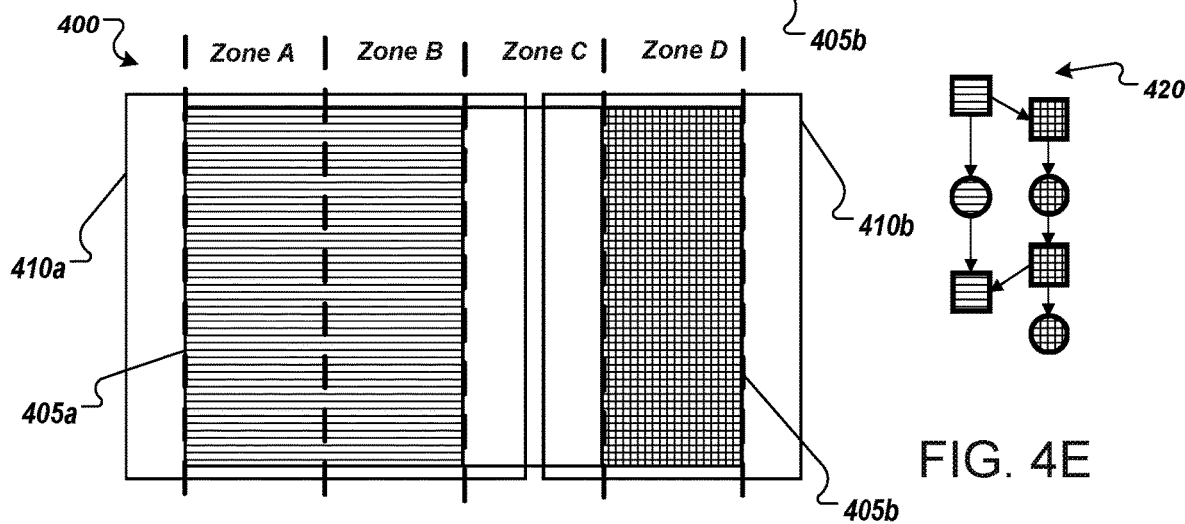

FIG. 4E shows an example step of the two-robot approach while a transition from Zone A to Zone B is occurring for the first robot, illustrated by job zone 405*a*, and fabrication is occurring in Zone D for the second robot, as illustrated by job zone 405*b*. In the example, after the second robot has finished transitioning to Zone D, it can begin fabricating in Zone D. Once the second robot has cleared Zone C, and thus the exclusion zone 410*b* does not cover Zone B, the first robot is free to transition to Zone B. Thus, there is a dependency on the second robot completing its C-to-D transition before the first robot 415 can begin its A-to-B transition. The dependency graph 420 represents this stage of the two-robot approach graphically.

Figure 4F:
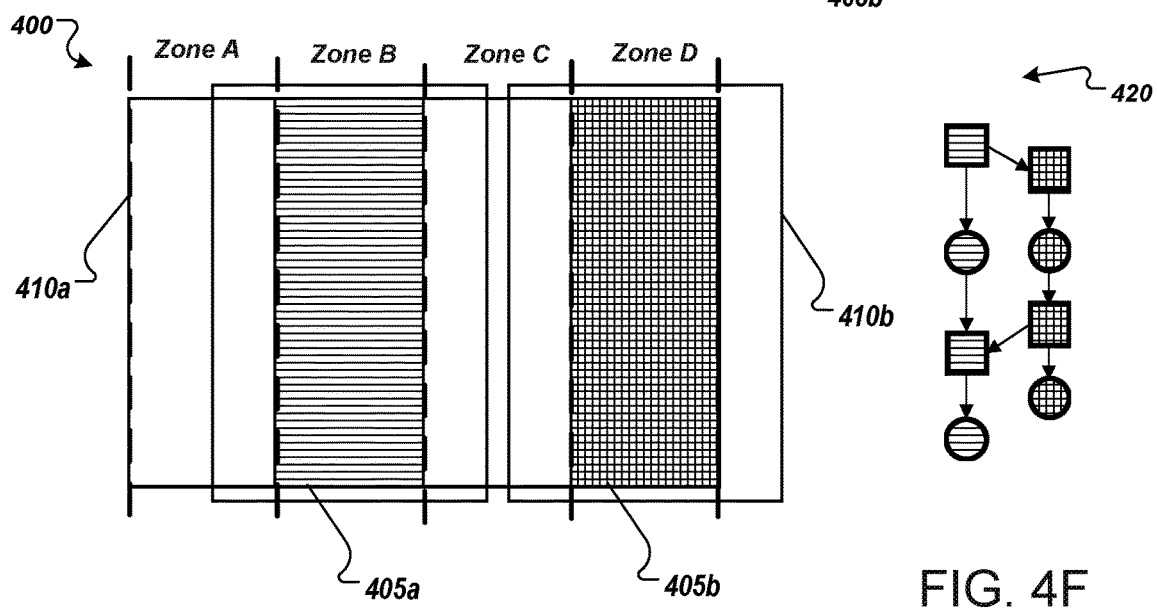

FIG. 4F shows an example step of the two-robot approach, in an instance when fabrication is occurring in both Zone B and Zone D. In continuing with the example, after the transition between Zone A and Zone B has been completed (shown in FIG. 4E), the first robot can begin fabricating in Zone B, as indicated by its job zone 405*a* being located in Zone B. The second robot continues fabricating in Zone D, which is similarly indicated by its job zone 405*b* being located in Zone D. The dependency graph 420 represents this stage of the two-robot approach graphically.

Figure 4G:
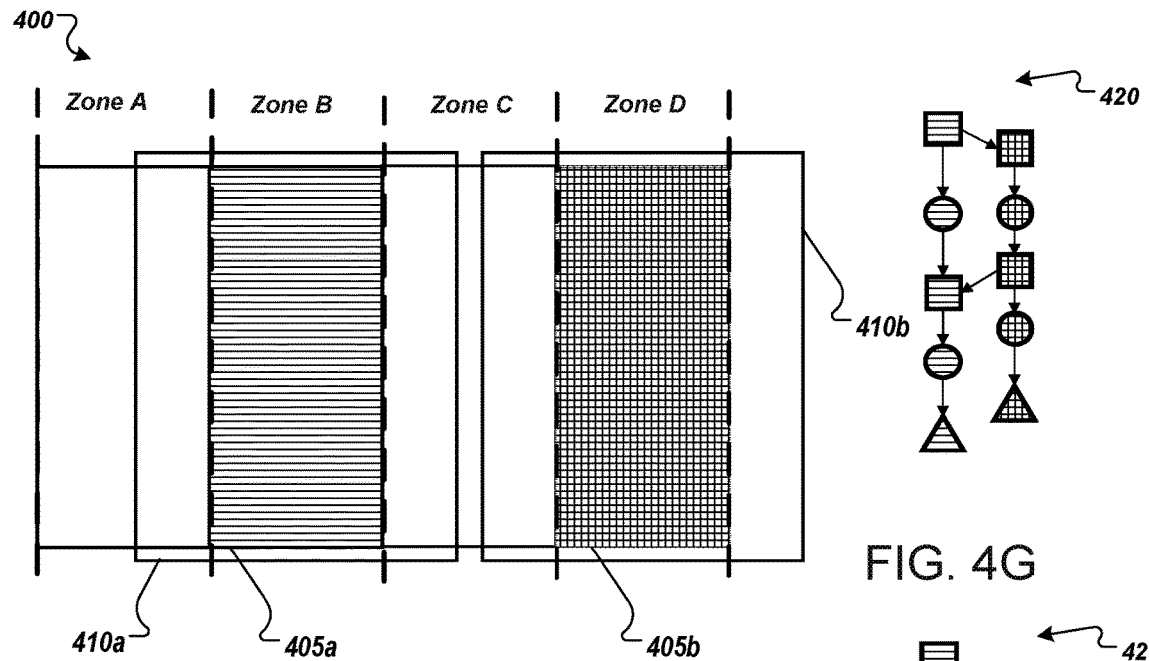

FIG. 4G shows an example step of the two-robot approach if both robots are performing movement in the direction of the Z-axis. Both robots can move in the Z direction to the level of the next layer after completing their respective fabricating in the corresponding zone. In continuing with the example, the first robot can move in the Z direction after completing fabricating in Zone B, the second robot can move after fabrication is finished in Zone D. As shown in FIG. 4G, the job zones for each robot 405*a*, 405*b* remain in Zone B and Zone D, respectively. The dependency graph 420 represents this stage of the two-robot approach graphically.

Figure 4H:
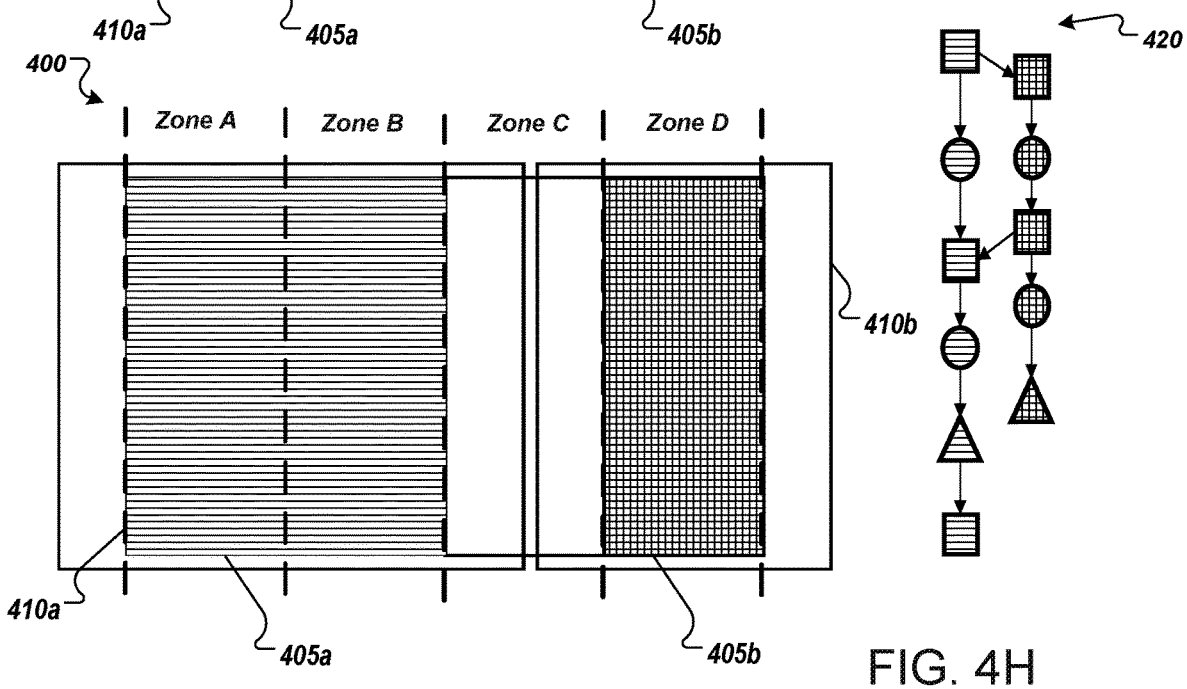

FIG. 4H shows an example step where the first robot is transitioning to Zone A used in implementing multi-robot synchronization. In continuing in the example, the system is at a similar state as shown in FIG. 4A, where the first robot is transitioning from Zone B to Zone A, and the second robot is waiting for the first robot to complete its transition. The first robot has returned to the position in Zone A, as the job zone 405*a* for the first robot is illustrated to be in this section of the fabrication area 400. Additionally, the job zone 405*b* for the second robot, is shown in Zone D. The dependency graph 420 represents this stage of the two-robot approach graphically.

Figure 4I:
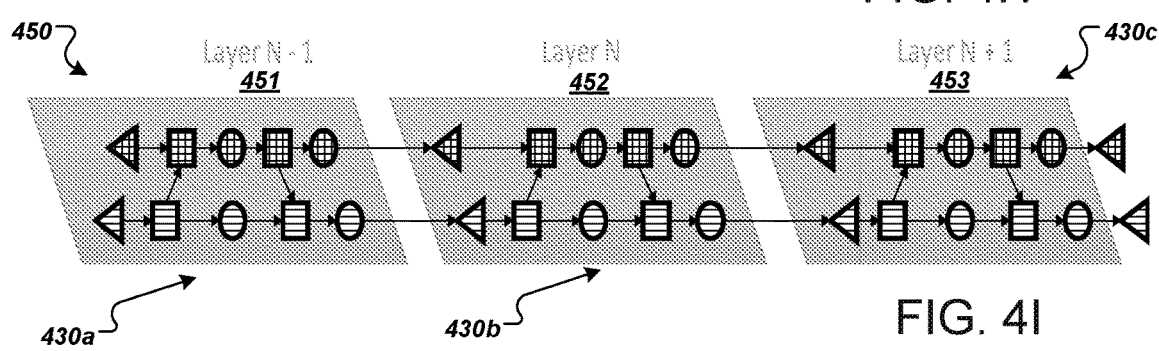

FIG. 4I shows a job dependency graph 450 illustrating an example of a process in the construction of an object according to the two-robot approach. For example, repeating the pattern of jobs shown in the dependency can be used to construct an object of M layers. The graph 450 illustrates examples of the jobs, using symbols from the respective dependency graphs representing each stage of the fabrication cycle (as shown in FIGS. 4A-4H) that are executed during the construction of a layer currently fabricated layer, a layer N 452, a N−1 layer 451 (e.g., previous layer), and a layer N+1 453 (e.g., subsequent layer). Also, the graph 450 shows jobs represented by a series of shapes corresponding to an action, or job, performed by the first robot (stripes) or the second robot (checkered), as discussed in detail in reference to FIG. 4A. The jobs corresponding to fabricating a particular layer of an object are represented within the associated layer boxes 430*a*, 430*b*, 430*c*. For example, jobs that are performed during the construction of layer N−1 451 are illustrated as shapes within layer box 430*a*. Dividing jobs based on layers may be necessary for some fabrication methods (FFF printing & some subtractive machining) but not another fabrication method.

Additionally, an alternative algorithm can be used to implement the two-robot approach if there are fabrication steps that require a single robot to traverse the entire span of the build volume. This second algorithm for multi-robot synchronization can involve, on each layer, the first robot moving out of the way so that the second robot can have full access to the build volume. In some implementations, this requires extending the range of motion of the second robot so that it can move out of the way of the build volume to avoid collision with the first robot. FIGS. 5A-5I show an example of a process used to synchronize two-robots for parallel task completion within a single shared build area according to the alternative algorithm.

Figure 5A:
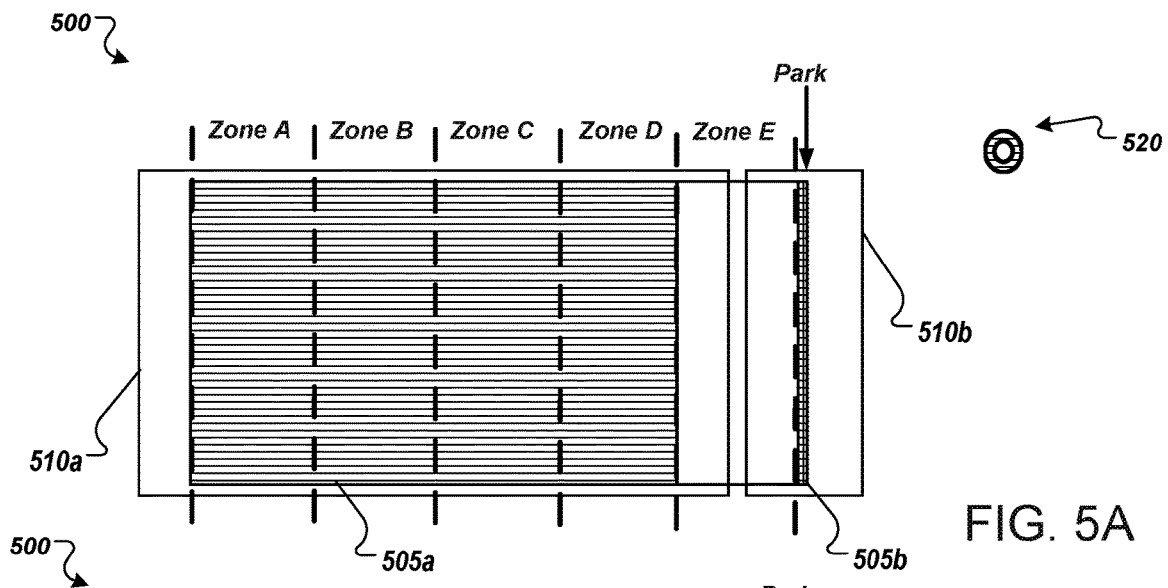
FIGS. 5A-5I show another example of a process used to synchronize two-robots for parallel task completion within a single shared build area.

FIG. 5A shows a top view of an alternative fabrication area 500 that can be used in the two-robot approach. The fabrication area 500 is similar to the fabrication area show in FIG. 4A, includes sections of the fabrication area, Zone A through Zone D. Fabrication area 500 additionally has Zone E and Park. The Park position is a position that can be out of the build volume for a second robot to pause, for example. Zone E can be a buffer zone that is between the Park position and Zone D.

FIG. 5A shows an example step in the two-robot approach performed according to the alternative algorithm. A fabrication cycle based on the alternative algorithm can begin with a second robot in the Park position. As a result, the first robot can perform any processes that need access to all four buildable zones (A, B, C, and D), illustrated as its job zone 505*a* covering each of these areas, and the first robot's exclusion zone 510*a* covers these zones as well as part of Zone E. For an FFF robot, for instance, this can include printing part perimeters that run the full length of the part. Also, the job zone 505*b* for the second robot is shown as located in the Park position, and so the second robot's exclusion zone 510*b* only covers part of Zone E and does not overlap the exclusion zone 510*a* of the first robot. The dependency graph 520 represents this stage of the two-robot approach graphically.

Figure 5B:
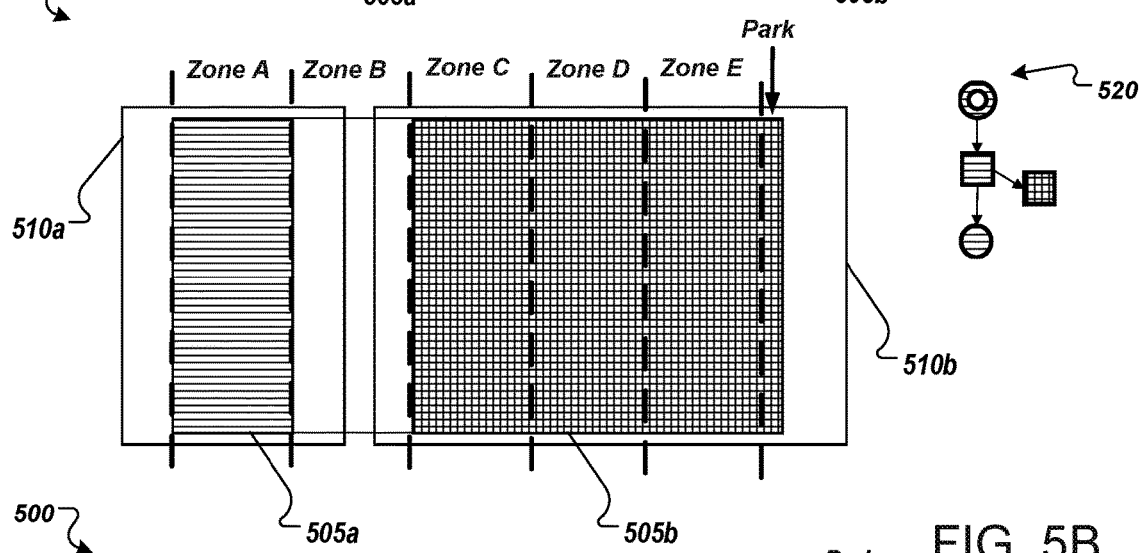

FIG. 5B shows an example step in the two-robot approach, where the first robot is fabricating in Zone A and the second robot is transitioning from Park to Zone C. In some cases, this stage is subsequent to the first robot transitioning back to Zone A. Referring back to the example of the fabrication cycle, the first robot can fabricate in Zone A, illustrated by job zone 505*a* being located in Zone A, after moving to that area. The second robot transitions to Zone C, shown as the exclusion zone 510*b* for the second robot spanning each of the zones from Park to Zone C. A job dependency can be introduced by this scenario, as the second robot can wait for the first robot to finish its transition to Zone A before the second robot begins its transition to Zone C. The dependency graph 520 represents this stage of the two-robot approach graphically.

Figure 5C:
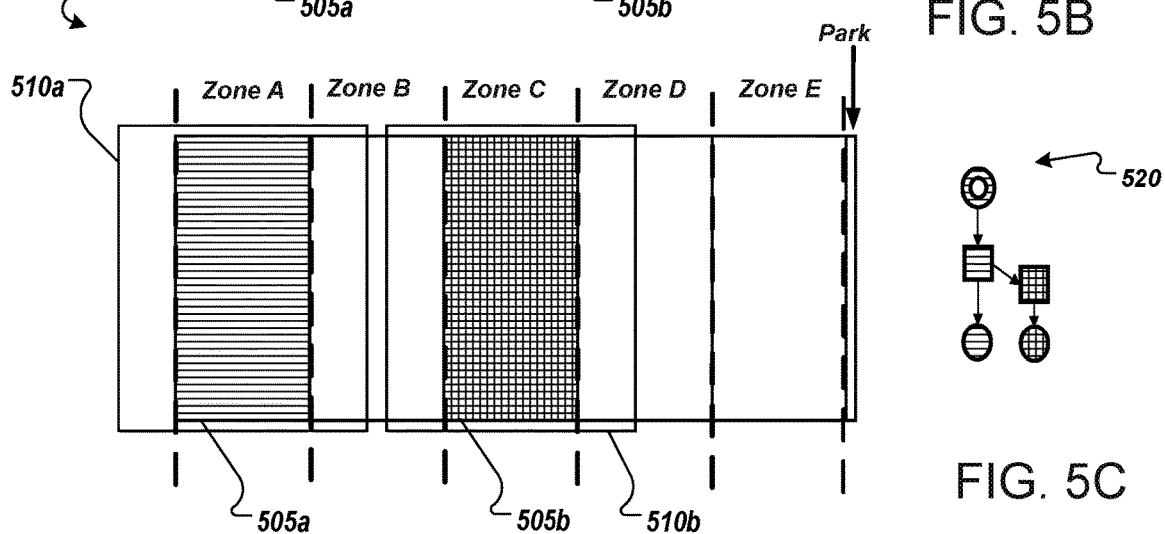

FIG. 5C shows an example step in the two-robot approach involving fabrication in Zone A and printing in Zone C. In continuing with the example of the fabrication cycle, the second robot can now begin fabricating in Zone C, as job zone 505b is shown in Zone C, while the first robot continues fabricating in Zone A with job zone 505a being shown in Zone A. The dependency graph 520 represents this stage of the two-robot approach graphically.

Figure 5D:
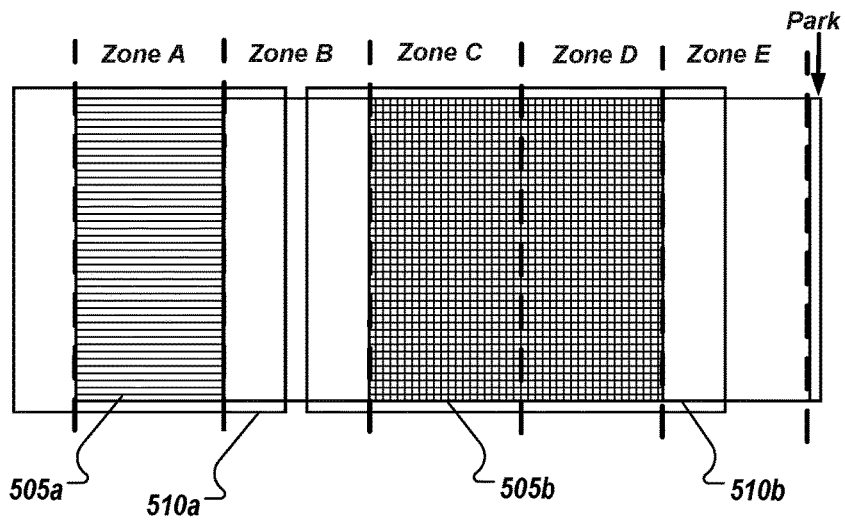

FIG. 5D shows an example step in the two-robot approach where fabrication is occurring in Zone A and the second robot is transitioning from Zone C to Zone D. After printing in Zone C finishes, referring to the fabrication cycle example, the second robot transitions from Zone C to Zone D, which can be shown by its exclusion area 510b covering these zones. If the first robot is finished fabricating in Zone A, illustrated by the job zone 505a being located in Zone A, it can wait for the second robot to complete the transition to Zone D. If any of the operations require the second robot to access Zone C and Zone D at the same time, for instance, those operations can be done at the time of the transition. The dependency graph 520 represents this stage of the two-robot approach graphically.

Figure 5E:
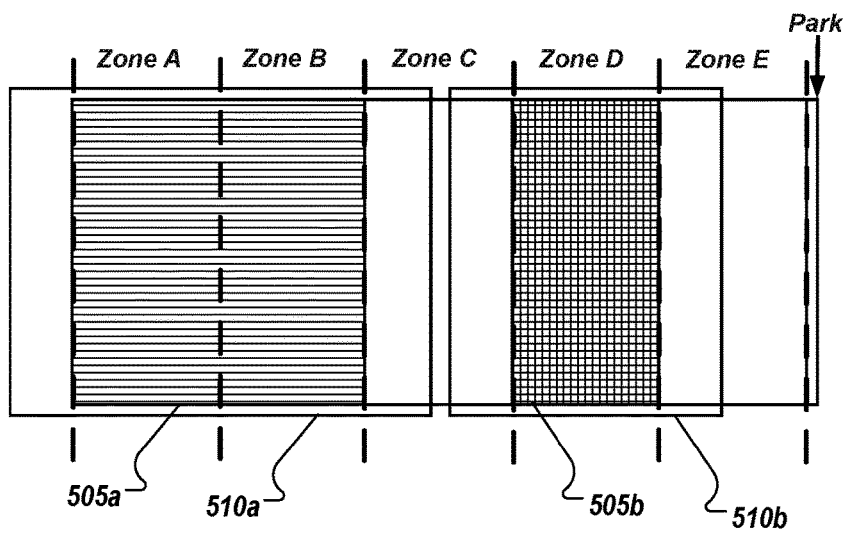

FIG. 5E shows an example step in the two-robot approach where the second robot is printing in Zone D, while the first robot is transitioning from Zone A to Zone B. The second robot can begin fabricating in Zone D, after transitioning to that zone is complete. As show in FIG. 5E, job zone 505b corresponding to the second robot is located in Zone D. Additionally, the first robot can move, namely transition from Zone A to Zone B, while the second robot is printing, as its exclusion zone 510a is shown to cover those areas. Note that the beginning of the first robot's transition from Zone A to Zone B depends on completion of the second robot's transition from Zone C to Zone D, so as to prevent risk of collision. The dependency graph 520 represents this stage of the two-robot approach graphically.

Figure 5F:
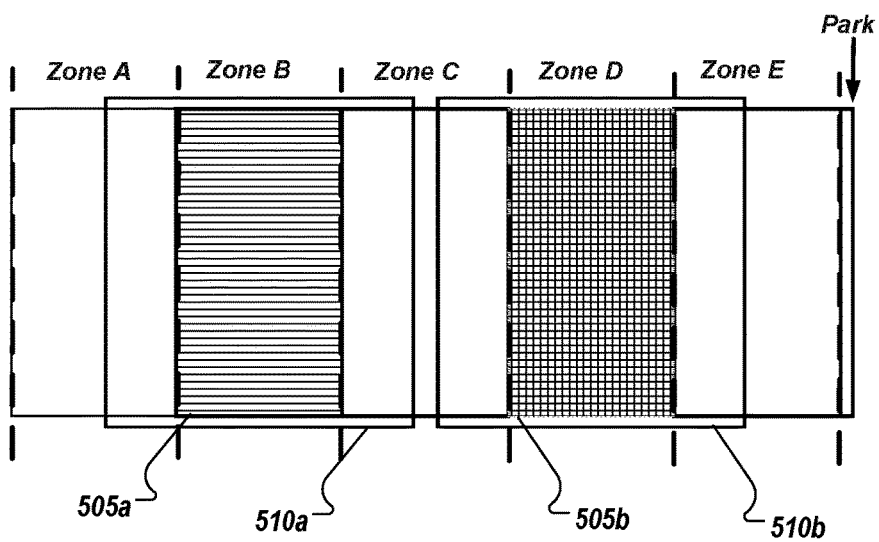

FIG. 5F shows an example step in the two-robot approach involving printing in both Zone B and in Zone D. For example, the second robot can begin fabricating in Zone D, illustrated by job zone 505b being positioned in Zone D, while the first robot continues fabricating in Zone B, illustrated as job zone 505a being located in Zone B.

Figure 5G:
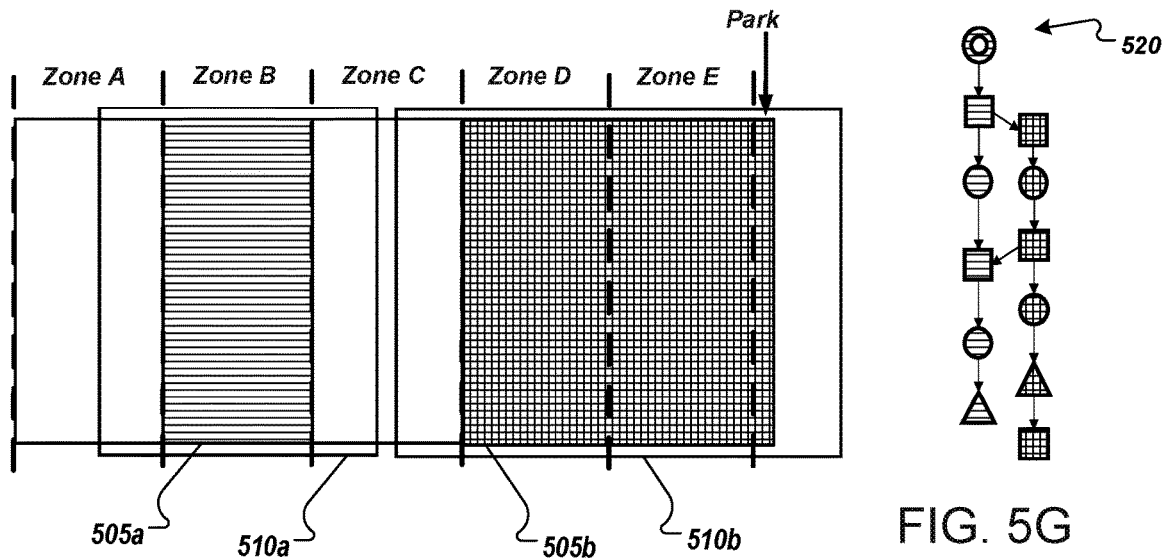

FIG. 5G shows an example step in the two-robot approach involving moving in a Z direction for the first robot, and transitioning from Zone D to Park for the second robot. In some cases, this stage is completed after both robots have moved in the Z direction to the level of the next layer after completing their respective fabricating. Thereafter, in continuing with the example of a fabrication cycle, the second robot can transition to Park after fabrication in Zone D is completed. The transitional movement of the second robot is shown by the exclusion area 510b including Zone D and Park. Meanwhile, the first robot operates in Zone B, which is shown by the job zone 505a being located in Zone B.

Figure 5H:
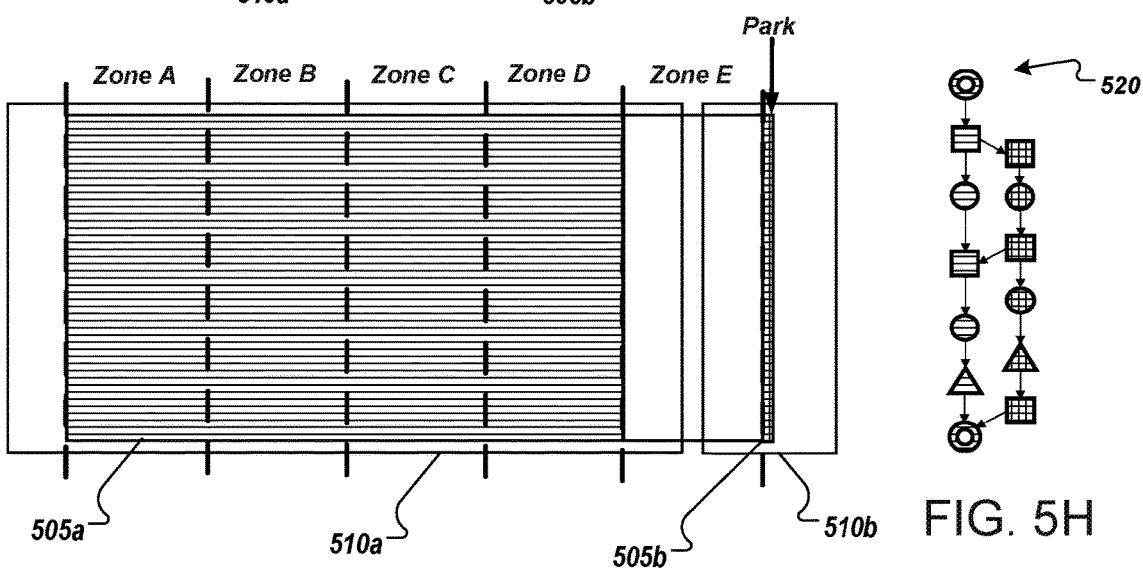

FIG. 5H shows an example step in the two-robot approach where operations are being conducted in Zone A-Zone D by the first robot. The second robot can be parked, or otherwise positioned out of the build volume, which is illustrated by its job zone 505b being located in the Park position. With the second robot paused in the Park position, the first robot can begin any full-length operation traversing Zone A, Zone B, Zone C, and Zone D, as shown by the job zone for the first robot covering each of these zones in the fabrication area 500. Thereafter, in some cases, the system can return back to the same state as the start of the fabrication cycle, as shown in FIG. 5A.

Figure 5I:
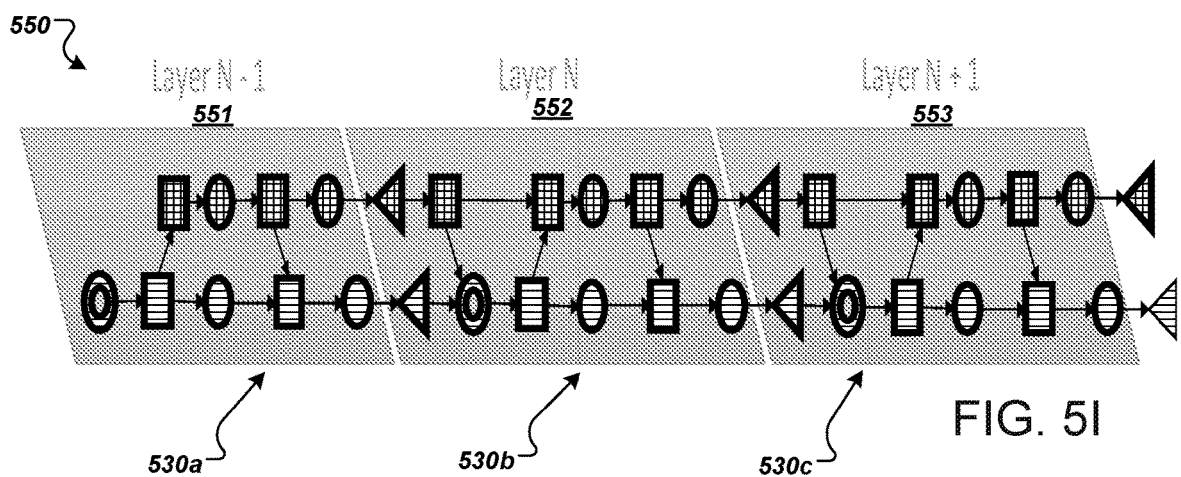

FIG. 5I shows a job dependency graph 550 characterizing construction of an object using the two-robot approach according to the alternative algorithm. For example, repeating the pattern of jobs shown in the dependency can be used to construct an object of M layers. The graph 550 illustrates examples of the jobs, using symbols from the respective dependency graphs representing each stage of the fabrication cycle (as shown in FIGS. 5A-5H) that are executed during the construction of a current layer, layer N 552, a N−1 layer 551 (e.g., previous layer), and a layer N+1 553 (e.g., subsequent layer). Also, the graph 550 shows jobs represented by a series of shapes corresponding to an action, or job, performed by the first robot (stripes) or the second robot (checkered), as discussed in detail in reference to FIG. 5A. The jobs corresponding to fabricating a particular layer of an object are represented within the associated layer boxes 530a. 530b, 530c. For example, jobs that are performed during the construction of layer N−1 551 are illustrated as shapes within layer box 430a. Dividing jobs based on layers may be necessary for some fabrication methods (FFF printing & some subtractive machining) but not another fabrication method.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this document, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a three-dimensional model of an object;
slicing the three dimensional model of the object into a plurality of layers;
determining two or more portions of a first layer of the plurality of layers and two or more portions of a second layer of the plurality of layers, each portion corresponding to an area of the object, wherein each portion of the second layer corresponds to an area that is different than areas corresponding to the portions of the first layer;
assigning the two or more portions of each of the first and second layers to two or more additive manufacturing robots;
generating toolpath information for the object based on the portions of the first and second layers, wherein the toolpath information includes data defining tool paths that are a specified distance apart for adjacent portions in the first and second layers such that the adjacent portions bond at an edge; and
providing the generated toolpath information to the two or more additive manufacturing robots, wherein each additive manufacturing robot is configured to move independently and without interference from another additive manufacturing robot;
wherein determining the two or more portions of the first layer comprises determining one or more seams for the first layer based on one or more separation starting points and respective offsets; and
wherein determining the one or more seams for the first layer based on the one or more separation starting points and the respective offsets further comprises:
determining that a corner of the object is within a threshold distance of a separation starting point; and
in response to determining that the corner of the object is within the threshold distance, locating a seam that corresponds to the separation starting point at the corner of the object.

2. The method of claim 1,
wherein determining the one or more seams for the first layer based on the one or more separation starting points and respective offsets further comprises:
determining workload balancing information based on the three-dimensional model of the object;
calculating the one or more separation starting points by apportioning workload information among the two or more additive manufacturing robots to minimize print time while taking account that each of the two or more additive manufacturing robots is configured to move independently and without interference from another additive manufacturing robot; and
calculating a respective offset that is within a threshold for each of the one or more separation starting points.

3. The method of claim 2, further comprising:
generating additional toolpath information to form an outer shell that is a third layer of the object including:
determining an outline of a boundary of the plurality of layers,
creating an outer perimeter surface for the plurality of layers, wherein the outer perimeter surface is offset from the outline, and
generating additional toolpath information for the outer perimeter surface; and
providing the generated additional toolpath information of the outer shell to one of the two or more additive manufacturing robots.

4. The method of claim 1, wherein all angles of the corner are greater than 15 degrees and less than 345 degrees, and a radius of the corner measured at any angle is less than four times a length of a cross section of a nozzle exit aperture used by one of the additive manufacturing robots.

5. The method of claim 1, wherein determining the two or more portions of the first layer further comprises:
determining that the one or more seams for the first layer do not overlap with one or more seams for the second layer, wherein the second layer is adjacent to the first layer; and
generating the two or more portions for the first layer based on a location of the one or more seams for the first layer.

6. The method of claim 1, wherein seams of the plurality of layers form a pattern when the plurality of layers are stacked.

7. The method of claim 6, wherein the pattern is a random or pseudo-random pattern.

8. The method of claim 6, wherein the pattern is a repeating or non-repeating geometric pattern.

9. A non-transitory computer-readable medium encoding instructions programmed to cause one or more hardware processors of one or more computing devices to perform operations comprising:
receiving a three-dimensional model of an object;
slicing the three dimensional model of the object into a plurality of layers;
determining two or more portions of a first layer of the plurality of layers and two or more portions of a second layer of the plurality of layers, each portion corresponding to an area of the object, wherein each portion of the second layer corresponds to an area that is different than areas corresponding to the portions of the first layer;
assigning the two or more portions of each of the first and second layers to two or more additive manufacturing robots;
generating toolpath information for the object based on the portions of the first and second layers, wherein the toolpath information includes data defining tool paths that are a specified distance apart for adjacent portions in the first and second layers such that the adjacent portions bond at an edge; and
providing the generated toolpath information to the two or more additive manufacturing robots, wherein each additive manufacturing robot is configured to move independently and without interference from another additive manufacturing robot;
wherein determining the two or more portions of the first layer comprises determining one or more seams for the first layer based on one or more separation starting points and respective offsets; and
wherein determining the one or more seams for the first layer based on the one or more separation starting points and the respective offsets further comprises:

determining that a corner of the object is within a threshold distance of a separation starting point; and in response to determining that the corner of the object is within the threshold distance, locating a seam that corresponds to the separation starting point at the corner of the object.

10. The non-transitory computer-readable medium of claim 9, wherein determining the one or more seams for the first layer based on the one or more separation starting points and respective offsets further comprises:

determining workload balancing information based on the three-dimensional model of the object;

calculating the one or more separation starting points by apportioning workload information among the two or more additive manufacturing robots to minimize print time while taking account that each of the two or more additive manufacturing robots is configured to move independently and without interference from another additive manufacturing robot; and calculating a respective offset that is within a threshold for each of the one or more separation starting points.

11. The non-transitory computer-readable medium of claim 10, wherein each additive manufacturing robot is configured to coordinate positioning and timing of movement with another additive manufacturing robot by defining one or more job zones associated with a fabrication area so as to avoid interference between the two or more additive manufacturing robots.

12. The non-transitory computer-readable medium of claim 10, the operations comprising:

generating additional toolpath information to form an outer shell that is a third layer of the object including:

determining an outline of a boundary of the plurality of layers, creating an outer perimeter surface for the plurality of layers, wherein the outer perimeter surface is offset from the outline, and generating additional toolpath information for the outer perimeter surface; and providing the generated additional toolpath information of the outer shell to one of the two or more additive manufacturing robots.

13. The non-transitory computer-readable medium of claim 10, wherein determining the two or more portions of the first layer further comprises:

determining that the one or more seams for the first layer do not overlap with one or more seams for the second layer, wherein the second layer is adjacent to the first layer; and generating the two or more portions for the first layer based on a location of the one or more seams for the first layer.

14. The non-transitory computer-readable medium of claim 9, wherein all angles of the corner are greater than 15 degrees and less than 345 degrees, and a radius of the corner measured at any angle is less than four times a length of a cross section of a nozzle exit aperture used by one of the additive manufacturing robots.

15. The non-transitory computer-readable medium of claim 9, wherein seams of the plurality of layers form a pattern when the plurality of layers are stacked.

16. The non-transitory computer-readable medium of claim 15, wherein the pattern is a random or pseudo-random pattern.

17. The non-transitory computer-readable medium of claim 15, wherein the pattern is a repeating or non-repeating geometric pattern.

* * * * *

UNITED STATES PATENT AND TRADEMARK OFFICE
CERTIFICATE OF CORRECTION

PATENT NO. : 10,620,611 B2
APPLICATION NO. : 15/758701
DATED : April 14, 2020
INVENTOR(S) : Gregory David Meess et al.

Page 1 of 1

It is certified that error appears in the above-identified patent and that said Letters Patent is hereby corrected as shown below:

On the Title Page

Please delete the sentence under the heading "Related U.S. Application Data" and insert therefor:
--(60) Provisional application No. 62/217,452, filed on Sep. 11, 2015.--

Signed and Sealed this
Ninth Day of June, 2020

Andrei Iancu
*Director of the United States Patent and Trademark Office*